US011380050B2

(12) United States Patent
Zhe et al.

(10) Patent No.: US 11,380,050 B2
(45) Date of Patent: Jul. 5, 2022

(54) FACE IMAGE GENERATION METHOD AND APPARATUS, DEVICE, AND STORAGE MEDIUM

(71) Applicant: TENCENT TECHNOLOGY (SHENZHEN) COMPANY LIMITED, Guangdong (CN)

(72) Inventors: Xue Fei Zhe, Shenzhen (CN); Yonggen Ling, Shenzhen (CN); Lin Chao Bao, Shenzhen (CN); Yi Bing Song, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/235,456

(22) Filed: Apr. 20, 2021

(65) Prior Publication Data

US 2021/0241521 A1    Aug. 5, 2021

Related U.S. Application Data

(63) Continuation of application No. PCT/CN2020/080335, filed on Mar. 20, 2020.

(30) Foreign Application Priority Data

Mar. 22, 2019  (CN) .......................... 201910222403.3

(51) Int. Cl.
*G06T 17/00* (2006.01)
*G06T 7/70* (2017.01)
(Continued)

(52) U.S. Cl.
CPC ............ *G06T 17/00* (2013.01); *G06K 9/6232* (2013.01); *G06N 3/02* (2013.01); *G06T 7/70* (2017.01);
(Continued)

(58) Field of Classification Search
CPC ........ G06N 3/088; G06N 3/02; G06N 3/0454; G06N 3/0472; G06V 40/16; G06V 40/171;
(Continued)

(56) References Cited

U.S. PATENT DOCUMENTS 6,492,986 B1    12/2002   Metaxas et al.
8,391,642 B1 *   3/2013   Petruszka ............... G06T 11/60
                                                        382/285
(Continued)

FOREIGN PATENT DOCUMENTS

CN    106910247 A    6/2017
CN    109410253 A    3/2019
CN    109961507 A    7/2019

OTHER PUBLICATIONS

International Search Report for PCT/CN2020/080335 dated Jun. 22, 2020 (PCT/ISA/210).
(Continued)

*Primary Examiner* — Xilin Guo
(74) *Attorney, Agent, or Firm* — Sughrue Mion, PLLC

(57) ABSTRACT

A face image generation method includes: determining, according to a first face image, a three dimensional morphable model (3DMM) corresponding to the first face image as a first model; determining, according to a reference element, a 3DMM corresponding to the reference element as a second model, the reference element representing a posture and/or an expression of a target face image; determining, according to the first model and the second model, an initial optical flow map corresponding to the first face image, and deforming the first face image according to the initial optical flow map to obtain an initial deformation map; obtaining, through a convolutional neural network, an optical flow increment map and a visibility probability map that correspond to the first face image; and generating the target face
(Continued)

image according to the first face image, the initial optical flow map, the optical flow increment map, and the visibility probability map.

20 Claims, 15 Drawing Sheets

(51) Int. Cl.
*G06K 9/62* (2022.01)
*G06N 3/02* (2006.01)
*G06V 40/16* (2022.01)

(52) U.S. Cl.
CPC .. *G06V 40/171* (2022.01); *G06T 2207/20084* (2013.01); *G06T 2207/30201* (2013.01)

(58) Field of Classification Search
CPC .. G06T 13/80; G06T 5/50; G06T 7/70; G06T 5/005; G06T 13/40; G06T 17/00; G06T 2207/20081; G06T 2207/20221; G06T 2207/20084; G06T 2207/30196; G06T 2207/10024; G06T 2207/30201; G06K 9/6232

See application file for complete search history.

(56) References Cited

U.S. PATENT DOCUMENTS

| | | | |
|---|---|---|---|
| 10,839,585 B2* | 11/2020 | Lee | G06V 40/165 |
| 2012/0007859 A1* | 1/2012 | Lee | G06T 13/40 |
| | | | 345/473 |
| 2018/0061028 A1* | 3/2018 | Sunkavalli | G06T 5/50 |
| 2018/0197330 A1 | 7/2018 | Wang | |
| 2020/0013212 A1* | 1/2020 | Wang | G06V 40/171 |
| 2020/0051303 A1* | 2/2020 | Li | G06T 13/40 |

OTHER PUBLICATIONS

Written Opinion of the International Searching Authority for PCT/CN2020/080335 dated Jun. 22, 2020 (PCT/ISA/237).
Chinese Office Action for 201910222403.3 dated May 13, 2020.

\* cited by examiner

FACE IMAGE GENERATION METHOD AND APPARATUS, DEVICE, AND STORAGE MEDIUM

CROSS-REFERENCE TO RELATED APPLICATION(S)

This application is a bypass continuation application of International Application No. PCT/CN2020/080335, filed on Mar. 20, 2020, which claims priority to Chinese Patent Application No. 201910222403.3, filed with the National Intellectual Property Administration, PRC on Mar. 22, 2019 and entitled "FACE IMAGE GENERATION METHOD AND APPARATUS, DEVICE, AND STORAGE MEDIUM", the disclosures of which are herein incorporated by reference in their entireties.

FIELD

The disclosure relates to the field of image processing technologies, and in particular, to a face image generation method and apparatus, a device, and a storage medium.

BACKGROUND

A face image generation technology is used in many scenarios. One or more face images are used as input to generate other face images similar to face image postures and facial expressions of the input. For example, based on a smiling face image of a person, a smiling face image of the person or other persons is generated through the face image generation technology.

Existing face image generation technologies directly rely on a generative adversarial network to synthesize a face image. The generative adversarial network has a relatively large parameter space and relatively high model complexity. The generative adversarial network does not achieve a sufficient training effect, and is prone to over-fitting. As a result, the synthesized face image is not natural and realistic enough, and the generative adversarial network only targets a particular face image and cannot achieve personalized face image synthesis.

SUMMARY

Embodiments of the disclosure provide a face image generation method. An initial optical flow map is generated through a three dimensional (3D) morphable model (3DMM), optical flow completion is then performed on the initial optical flow map based on a convolutional neural network, and a target face image is finally synthesized based on a target optical flow map after the optical flow completion. In this way, a contour of a face image in a first reference element may be retained, and a pose and an expression of a target face image represented by a second reference element may also be retained, so that the generated target face image is more realistic and natural. Moreover, personalized face image synthesis may be achieved based on the 3DMM. Accordingly, the embodiments of the disclosure further provide a face image generation apparatus, a device, a computer-readable storage medium, and a computer program product.

In an aspect of example embodiments, provided is a face image generation method, including:

determining, according to a first face image, a three dimensional (3D) morphable model (3DMM) corresponding to the first face image as a first model;

determining, according to a reference element, a 3DMM corresponding to the reference element as a second model, the reference element representing a posture and/or an expression of a target face image;

determining, according to the first model and the second model, an initial optical flow map corresponding to the first face image, and deforming the first face image according to the initial optical flow map to obtain an initial deformation map corresponding to the first face image;

obtaining, through a convolutional neural network according to the first face image, the initial optical flow map, and the initial deformation map, an optical flow increment map and a visibility probability map that correspond to the first face image; and generating the target face image according to the first face image, the initial optical flow map, the optical flow increment map, and the visibility probability map.

In an aspect of example embodiments, provided is a face image generation apparatus, including:

at least one memory configured to store program code; and at least one processor configured to read the program code and operate as instructed by the program code, the program code comprising:

first model generation code configured to cause at least one of the at least one processor to determine, according to a first face image in a first reference element, a three dimensional (3D) morphable model (3DMM) corresponding to the first face image as a first model;

second model generation code configured to cause at least one of the at least one processor to determine, according to a reference element, a 3DMM corresponding to the reference element as a second model; the reference element representing a posture and/or an expression of a target face image;

determination code configured to cause at least one of the at least one processor to determine, according to the first model and the second model, an initial optical flow map corresponding to the first face image, and deform the first face image according to the initial optical flow map to obtain an initial deformation map corresponding to the first face image;

acquisition code configured to cause at least one of the at least one processor to obtain, through a convolutional neural network according to the first face image, the initial optical flow map, and the initial deformation map, an optical flow increment map and a visibility probability map that correspond to the first face image; and target face image generation configured to cause at least one of the at least one processor to generate the target face image according to the first face image and the initial optical flow map, the optical flow increment map, and the visibility probability map.

In an aspect of example embodiments, provided is non-transitory computer-readable storage medium storing instructions, the instructions being executable by at least one processor to cause at least one of the at least one processor to perform:

determining, according to a first face image, a three dimensional (3D) morphable model (3DMM) corresponding to the first face image as a first model;

determining, according to a reference element, a 3DMM corresponding to the reference element as a second model, the reference element representing a posture and/or an expression of a target face image;

determining, according to the first model and the second model, an initial optical flow map corresponding to the first face image, and deforming the first face image according to the initial optical flow map to obtain an initial deformation map corresponding to the first face image;

obtaining, through a convolutional neural network according to the first face image, the initial optical flow map, and the initial deformation map, an optical flow increment map and a visibility probability map that correspond to the first face image; and generating the target face image according to the first face image, the initial optical flow map, the optical flow increment map, and the visibility probability map.

In an aspect of example embodiments, provided is a device, including a processor and a memory;

the memory being configured to store program code; and the processor being configured to read the program code and perform the operations in the face image generation method.

In an aspect of example embodiments, provided is a non-transitory computer-readable storage medium, configured to store program code, the program code being used to perform the face image generation method in the foregoing aspect.

In an aspect of example embodiments, provided is a computer program product, including instructions that are executable by a computer to cause the computer to perform the face image generation method in the foregoing aspect.

BRIEF DESCRIPTION OF THE DRAWINGS

The above and other aspects, features, and advantages of certain embodiments of the present disclosure will be more apparent from the following detailed description taken in conjunction with the accompanying drawings.

DETAILED DESCRIPTION

Figure 1:
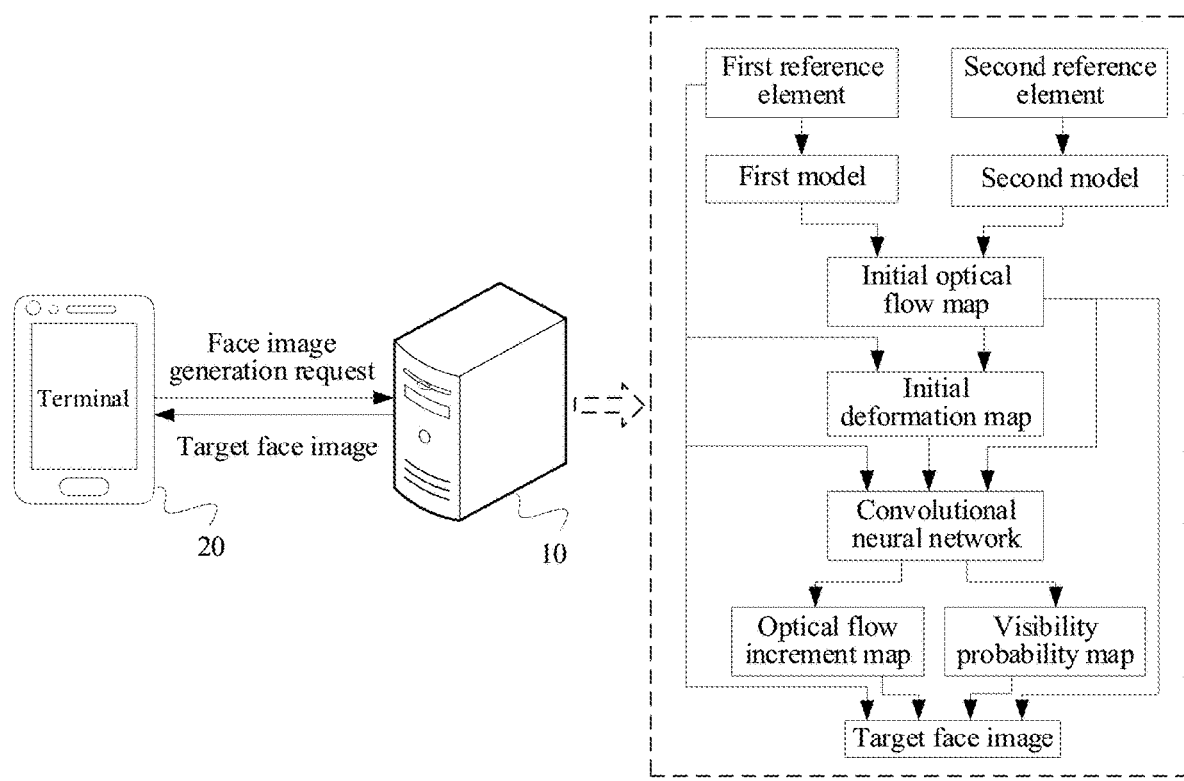
FIG. 1 is a diagram of an application scenario of a face image generation method according to an embodiment of the disclosure.

In order to enable a person skilled in the art to better under the solutions of the disclosure, the following clearly and completely describes the technical solutions of the embodiments of the disclosure with reference to the accompanying drawings in the embodiments of the disclosure. The described embodiments are merely some rather than all of the embodiments of the disclosure. All other embodiments obtained by a person of ordinary skill in the art based on the embodiments of the disclosure without creative efforts shall fall within the protection scope of the disclosure.

The terms such as "first", "second", "third", and "fourth" (if any) in the specification and claims of the disclosure and in the accompanying drawings are used for distinguishing similar objects and not necessarily used for describing any particular order or sequence. It is to be understood that such used data is interchangeable where appropriate so that the embodiments of the disclosure described here may be implemented in an order other than those illustrated or described here. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

In the related art, there are problems of unstable training and mode loss that exist in a face image generated based on the generative adversarial network and that the face image generated based on the generative adversarial neural network is not sufficiently natural and realistic, due to high model complexity and poor generalization performance. To solve this problems, the disclosure provides a face image generation method based on an optical flow map. In the method, an initial optical flow map is determined through three dimensional (3D) morphable models (3DMMs). In this way, the method may retain a contour of a first face image in a first reference element and at least one of the posture and the expression of the target face image identified by a second reference element, and on the other hand, may achieve parameterized control through the 3DMMs, thereby facilitating a user to achieve personalized image synthesis according to an actual demand. Then, an initial deformation map is obtained by deforming the face image according to the initial optical flow map, a corresponding optical flow increment map and a corresponding visibility probability map are obtained through a convolutional neural network according to the initial optical flow map and the initial deformation map, and the target face image is generated according to the first face image and the initial optical flow map, the optical flow increment map, and the visibility probability map that correspond to the first face image, so that the method retains more details of an original image in the generated target face image, thereby providing a more realistic and natural face image.

The method does not rely on a single network, but implement the corresponding functions through different small networks, thereby greatly reducing a parameter space, reducing model complexity, and improving generalization performance. In a practical application, the method may generate a natural and realistic face image.

It would be understood that the face image generation method according to the disclosure is applicable to a processing device with graphics processing capability. The processing device may be any terminal or server including a central processing unit (CPU) and/or a graphics processing unit (GPU). The processing device may perform the face image generation method according to the disclosure independently or through cluster collaboration. The method may be stored on the processing device in the form of an application program or software. The processing device implements the face image generation method according to the disclosure by executing the application program or software.

In order to make the technical solutions of the disclosure clearer and easy to understand, the following introduces the face image generation method according to the disclosure in combination with an example application scenario. Referring to a diagram of an application scenario for a face image generation method shown in FIG. 1, the scenario includes a server 10 and a terminal 20. The terminal 20 transmits a face image generation request to the server 10. The face image generation request carries a first reference element and a second reference element. The first reference element includes a first face image. The second reference element is used for representing a posture and/or an expression of a target face image. The server 10 determines, according to the first face image in the first reference element, a 3DMM corresponding to the first face image as a first model, determines, according to the second reference element, a 3DMM corresponding to the second reference element as a second model, then determines, according to the first model and the second model, an initial optical flow map corresponding to the first face image, and obtains an initial deformation map corresponding to the first face image by deforming the first face image in the first reference element according to the initial optical flow map. The server 10 obtains, through a convolutional neural network according to the first face image in the first reference element and the initial optical flow map and the initial deformation map that correspond to the first face image, an optical flow increment map and a visibility probability map that correspond to the first face image, and generates the target face image according to the first face image in the first reference element and the initial optical flow map, the optical flow increment map, and the visibility probability map that correspond to the first face image. Then, the server 10 returns the target face image to the terminal 20.

Next, operations of the face image generation method according to the embodiment of the disclosure are described in detail from the perspective of a server.

Figure 2A:
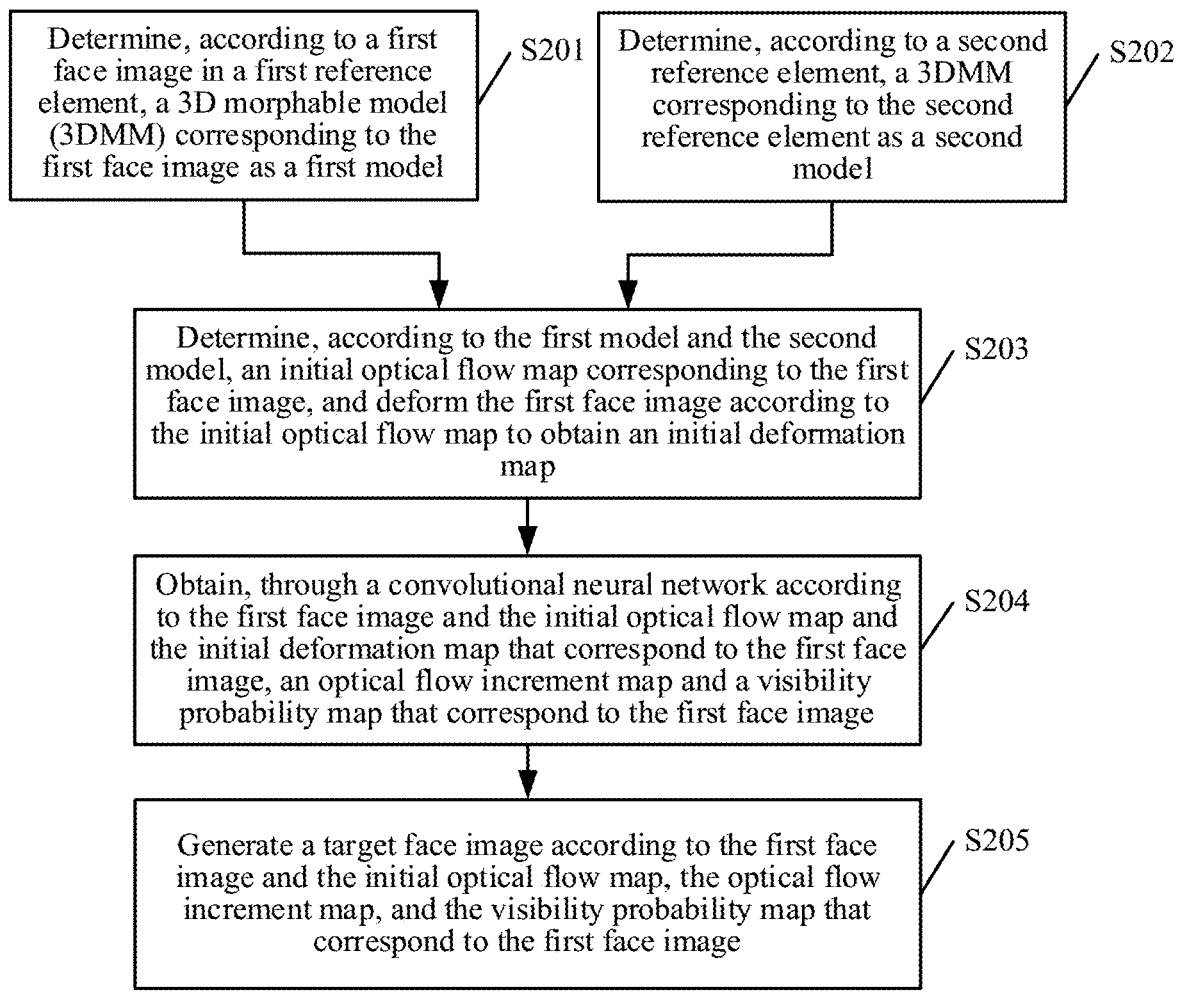
FIG. 2A is a flowchart of a face image generation method according to an embodiment of the disclosure.

Referring to a flowchart of a face image generation method shown in FIG. 2A, the method includes the following operations S201-S205:

S201: Determine, according to a first face image in a first reference element, a 3DMM corresponding to the first face image as a first model.

S202: Determine, according to a second reference element, a 3DMM corresponding to the second reference element as a second model.

The first reference element includes a first face image. The second reference element is used for representing a posture and/or an expression of a target face image. The face image generation method according to the embodiment of the disclosure generates a target face image with a designated posture and/or a designated expression based on the first face image.

In an example embodiment, the posture refers to the appearance of a body. In an example embodiment, the posture may include, for example, the appearance of a body part (e.g., a head). The posture may be represented by an angle between a central axis of the head and a horizontal or vertical direction. In some examples of the disclosure, the posture may include a left deviation at an angle of 30° to the vertical direction, or a right deviation at an angle of 60° to the vertical direction.

The expression refers to a thought or an emotion expressed in a face and/or posture. Facial expressions may be represented by differences between five sense organs and the five sense organs under normal conditions. For example, the upturned corners of the mouth indicate smile, the drooping corners of the mouth indicate depression, and the like. Certainly, some expressions may also be represented by postures. For example, an expression of being at a loss may be represented by a posture of scratching a head with a hand.

Based on this, the second reference element may represent the posture and/or the expression of the target face image in different forms. In some example embodiments, the second reference element may include a target model parameter representing a posture and/or an expression, or may include a second face image. The second face image is different from the first face image. In this case, a posture and/or an expression in the second face image represent(s) the posture and/or the expression of the target face image.

In this embodiment, in response to the second reference element including a target model parameter, a 3DMM corresponding to the target model parameter is determined as the second model according to the target model parameter. In response to the second reference element including a second face image, a 3DMM corresponding to the second face image is determined as the second model according to the second face image.

The embodiment of the disclosure provides two methods to determine the 3DMM corresponding to the first face image, that is, calculating a model coefficient through a mathematical algorithm and directly determining a model coefficient through a network. The two methods are described in detail below.

The first method is as follows. A server detects face key point coordinates in the first face image, constructs an initial 3DMM according to an average face (or an average face image), projects 3D coordinates of the initial 3DMM to a two dimensional (2D) image to obtain projection coordinates, then determines a first model parameter minimizing a distance between the face key point coordinates and the projection coordinates, and determines, according to the first model parameter, a 3DMM corresponding to the first face image.

Specifically, the average face refers to a synthetic face (or a synthetic face image) obtained by extracting facial features from a particular number of ordinary faces (or a particular number of face images), averaging measured data, and then using a computer technology. The initial 3DMM that is constructed according to the average face may be presented by a set of face 3D points. The set is denoted as S={p(x, y, z)}. The initial 3DMM is a 3D face linear model, and may be represented through the following formulas:

$$S=\overline{S}+A_{id}a_{id}+A_{exp}a_{exp} \quad (1)$$

where $\overline{S}$ denotes the average face, $A_{id}$ and $A_{exp}$ are a shape base and an expression base, and $a_{id}$ and $a_{exp}$ are coefficients corresponding to the shape base and the expression base respectively. The initial 3DMM may be projected to a 2D image according to the following weak projection model to obtain projection coordinates:

$$V(p)=f*Pr*R*S+t_{2d} \quad (2)$$

where f denotes a focal length of a camera, and Pr denotes an orthogonal projection matrix. In an example $$Pr = \begin{pmatrix} 1 & 0 & 0 \\ 0 & 1 & 0 \end{pmatrix}.$$

R denotes a rotation matrix corresponding to a rotation angle, and $t_{2d}$ denotes a pixel translation parameter. For a single first face image, the server detects face key point coordinates u(x, y) in the first face image, and a distance $E_1$ between the face key point coordinates and the projection coordinates may be represented through the following formula:

$$E_1=\Sigma\|u(x,y)-V(p)\| \quad (3)$$

By minimizing $E_1$, a first model parameter [$a_{id}$, $a_{exp}$, f, R, $t_{2d}$] may be calculated. Parameters in the initial 3DMM are updated according to the first model parameter, and the 3DMM corresponding to the first face image may be determined.

The second method is as follows. The server detects face key point coordinates in the first face image, then obtains a second model parameter through a neural network model according to the face key point coordinates and the first face image, and determines, according to the second model parameter, the 3DMM corresponding to the first face image.

Figure 3:
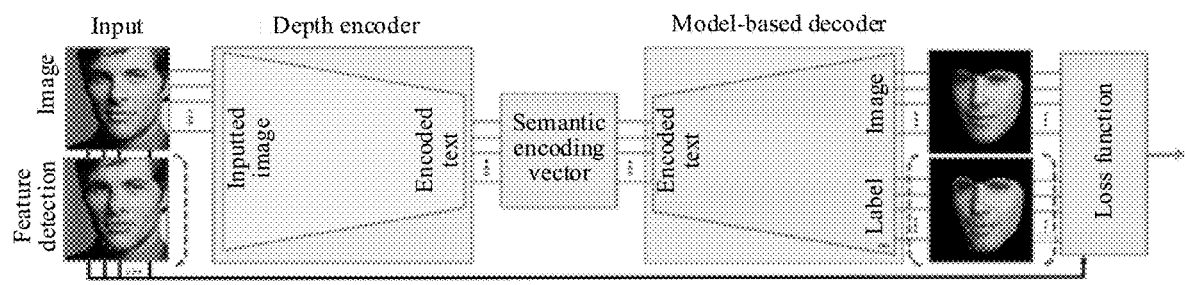
FIG. 3 is a flowchart of determining, based on a neural network model, a three dimensional (3D) morphable model (3DMM) corresponding to a first face image according to an embodiment of the disclosure.

FIG. 3 is a flowchart of determining a 3DMM corresponding to a first face image based on a neural network model. As shown in FIG. 3, the neural network model includes a depth encoder and a model-based decoder. After the first face image is inputted, face feature detection is performed on the first face image to obtain face key point coordinates. The depth encoder of the neural network model may encode the first face image and the face key point coordinates, and then a semantic encoding vector may semantically encode encoded text. The encoder may be implemented through alexNet or VGG-Face. The semantic encoding vector may be implemented through model parameters [$a_{id}$, $a_{exp}$, f, R, $t_{2d}$] of the neural network model. Next, the neural network model decodes the semantically encoded text by using the model-based decoder for image reconstruction. Then, the server calculates a model loss function. The loss function includes at least a distance between the face key point coordinates and projection coordinates, and a face key point projection brightness difference. The calculation of the distance between the face key point coordinates and the projection coordinates may be obtained with reference to the formula 3. The calculation of the projection brightness difference may be obtained with reference to the following formula:

$$E_2=\Sigma\|Iu(x,y)-I(V(p))\| \quad (4)$$

where $E_2$ represents the projection brightness difference, I represents the brightness, Iu(x, y) denotes the brightness of face key points u(x, y) obtained by detecting the first face image, and I (V (p)) denotes the brightness when the face key points is projected from a 3DMM to a 2D image.

When the second reference element includes a second face image, a process of determining a 3DMM corresponding to the second face image according to the second face image may be obtained with reference to any one of the above two methods for determining the first model, and is not described in detail in this embodiment.

When the second reference element includes a target model parameter representing a posture or an expression, the server may directly determine, based on the target model parameter, a 3DMM corresponding to the target model parameter. Specifically, when the target model parameter included in the second reference element includes only some parameters in the model parameters [$a_{id}$, $a_{exp}$, f, R, $t_{2d}$], some parameters in the second reference element may be used to replace some parameters in initial model parameters, and default values of the remaining parameters are kept unchanged to obtain updated model parameters. The 3DMM corresponding to the target model parameter may be determined according to the updated parameters.

The first reference element may include one or more first face images. When the first reference element includes a plurality of different first face images belonging to the same person, the server may determine, for each of the first face images in the first reference element, the 3DMM corresponding to each first face image as the first model corresponding to the first face image.

Figure 2B:
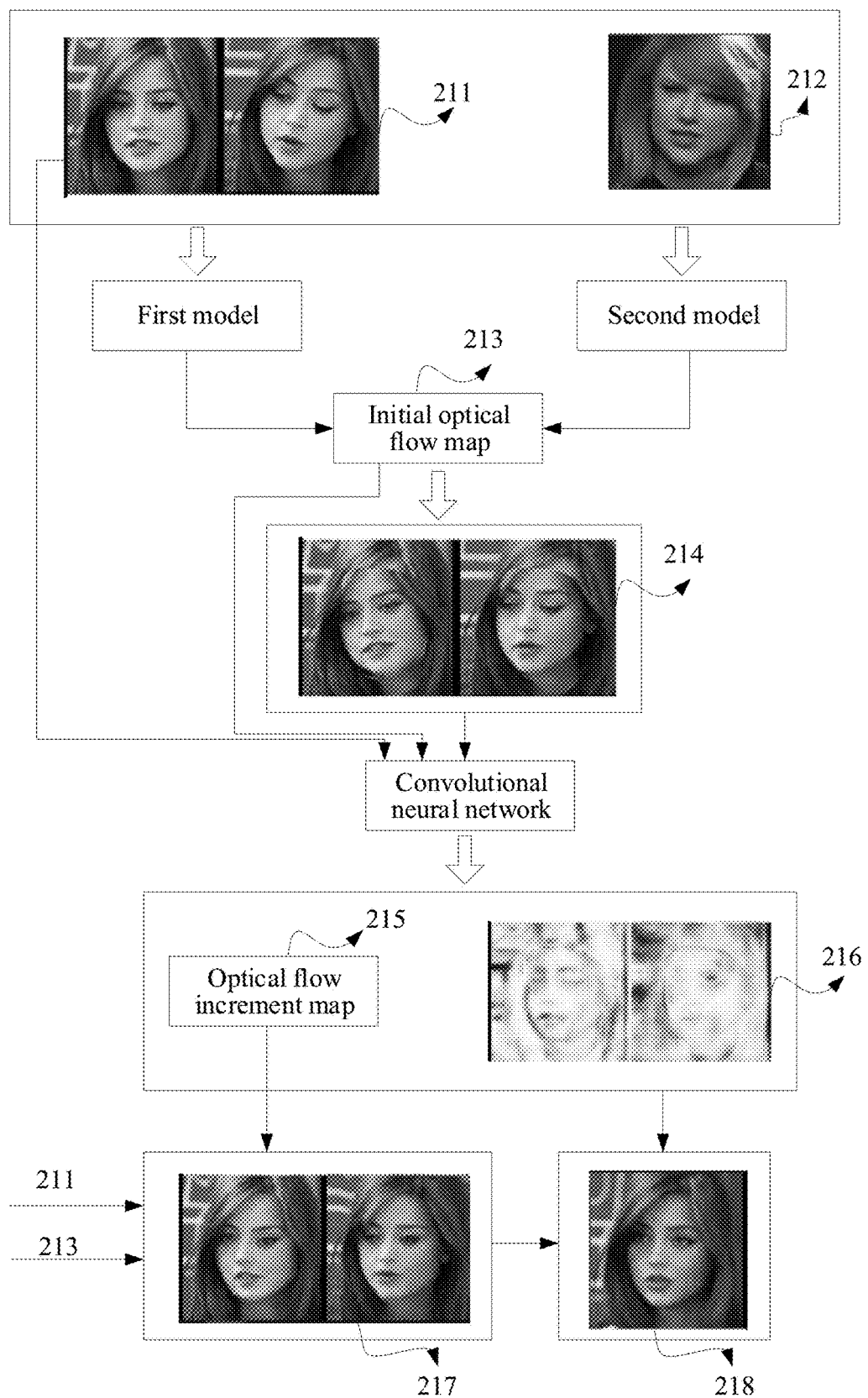
FIG. 2B is an exemplary effect diagram of image synthesis based on FIG. 2A.

For ease of understanding, an implementation effect of the method is exemplified below with reference to FIG. 2B. As shown in FIG. 2B, the first reference element includes two first face images 211. The second reference element includes one second face image 212. A corresponding first model is determined according to each of the first face images 211. A corresponding second model is determined according to the second face image 212. Since the first face image 211 includes two first face images, the first model includes two first models respectively corresponding to the two first face images.

S203: Determine, according to the first model and the second model, an initial optical flow map corresponding to the first face image, and deform the first face image according to the initial optical flow map to obtain an initial deformation map corresponding to the first face image.

In this embodiment, the server compares the first model with the second model and calculates the initial optical flow map based on a projection geometric relationship. In some example embodiments, the server may calculate the initial optical flow map through a projected normalized coordinate code (PNCC) image. Specifically, the server, according to a PNCC algorithm, projects the first model to obtain an inputted PNCC image, projects the second model to obtain a target PNCC image, then searches the inputted PNCC image and the target PNCC image for pixel points with a minimum pixel difference as corresponding points, calculates pixel differences between each set of corresponding points, and generates an initial optical flow map according to the pixel differences between each set of corresponding points.

Figure 2C:
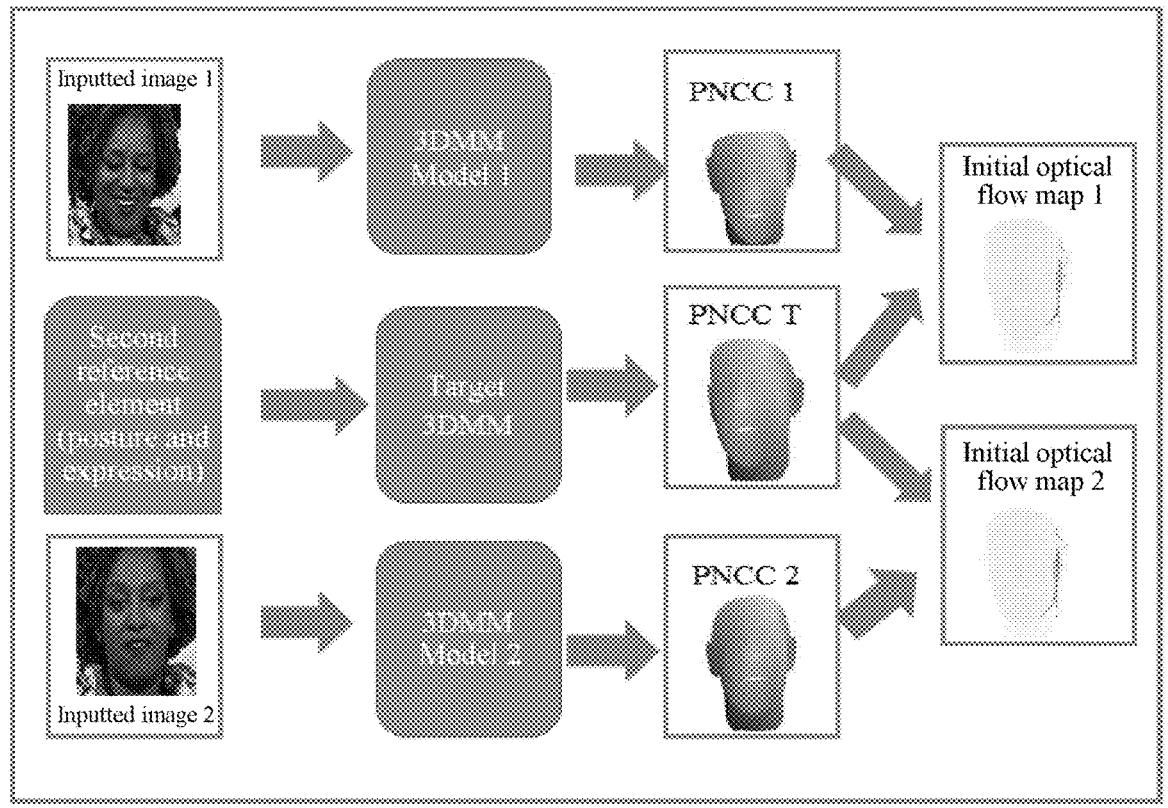
FIG. 2C is an exemplary effect diagram of generating an initial optical flow map based on FIG. 2A.

Referring to FIG. 2C, after two first face images (an inputted image 1 and an inputted image 2) and a second reference element that represents a posture and an expression of a target face image are inputted to obtain 3DMM models (a 3DMM model 1 and a 3DMM model 2) respectively corresponding to the two first face images and a target 3DMM model (i.e., a second model) corresponding to the second reference element, corresponding PNCC images may be obtained by respectively projecting the foregoing 3DMM models. Specifically, PNCC 1 is obtained by projecting the 3DMM model 1, PNCC 2 is obtained by projecting the 3DMM model 2, and PNCC T is obtained by projecting the target 3DMM model. The PNCC 1 and the PNCC T are searched for pixel points with a minimum pixel difference as corresponding points, pixel differences between each set of corresponding points are calculated, and an initial optical flow map 1 corresponding to the inputted image 1 is generated according to the pixel differences between each set of corresponding points. Similarly, the PNCC 2 and the PNCC T are searched for pixel points with a minimum pixel difference as corresponding points, between each set of corresponding points are calculated, and an initial optical flow map 2 corresponding to the inputted image 2 is generated according to the pixel differences between each set of corresponding points. The initial optical flow map is generally presented in the form of color. The initial optical flow map in FIG. 2C is only an effect of turning the color into gray scale.

Further, the server may deform the first face image according to the initial optical flow map to obtain an initial deformation map corresponding to the first face image. It would be understood that the initial optical flow map describes a pixel correspondence between the first face image in the first reference element and the image represented by the second reference element. Therefore, a pixel position on the first face image and corresponding to the initial optical flow map is found according to the initial optical flow map, and a pixel value in the initial optical flow map is copied to the corresponding pixel position on the first face image to obtain the initial deformation map corresponding to the first face image.

When the first reference element includes a plurality of first face images, an initial optical flow map corresponding to each first face image is obtained, and then the face image is deformed according to the initial deformation map corresponding to each first face image, to obtain an initial deformation map corresponding to the face image. In other words, when the first reference element includes a plurality of first face images, an initial deformation map corresponding to each first face image is obtained.

Referring to FIG. 2B, after an initial optical flow map 213 is determined according to the first model and the second model, a corresponding initial deformation map 214 is generated by deforming the first face image 211 according to the initial optical flow map 213. The initial deformation map 214 includes initial deformation maps respectively corresponding to the two first face images.

S204: Obtain, through a convolutional neural network according to the first face image and the initial optical flow map and the initial deformation map that correspond to the first face image, an optical flow increment map and a visibility probability map that correspond to the first face image.

Since the initial optical flow map includes only part of a face, the server may complete and correct the initial optical flow map to generate a realistic and natural face image. In a practical application, the server may obtain, through the convolutional neural network, the optical flow increment map and the visibility probability map that correspond to the first face image.

The optical flow increment map is formed according to optical flow increments of pixel points of the first face image. Optical flows of pixel points of the first face image may be generated according to the optical flow increments of the pixel points of the first face image and initial optical flows of pixel points in the initial optical flow map corresponding to the first face image, so as to implement optical flow completions and correction. The visibility probability map represents probabilities of the pixel points in the first face image appearing in the target face image. Details of the first face image retained in the target face image may be determined based on the visibility probability map.

Referring to FIG. 2B, the first face image 211, and the initial optical flow map 213 and the initial deformation map 214 that correspond to the first face image 211, are inputted to the convolutional neural network, to obtain an optical flow increment map 215 and a visibility probability map 216 that correspond to the first face image 211 and are outputted by the convolutional neural network. The optical flow increment map 215 includes optical flow increment maps respectively corresponding to the two first face images. The visibility probability map 216 includes visibility probability maps respectively corresponding to the two first face images.

In an example embodiment, the convolutional neural network may adopt an encoder-decoder network structure. As an example of the disclosure, the network structure may be a U-NET structure. U-NET is a convolutional neural network based on an encoder-decoder structure, generally used in image segmentation tasks. The encoder structure reduces a spatial dimension and extracts semantic features of an image through a pooling layer, while the decoder structure restores details of an object and restores the spatial dimension through a deconvolution layer. A quick connection exists between the encoder and the decoder to help the decoder better recover details of a target.

Figure 4:
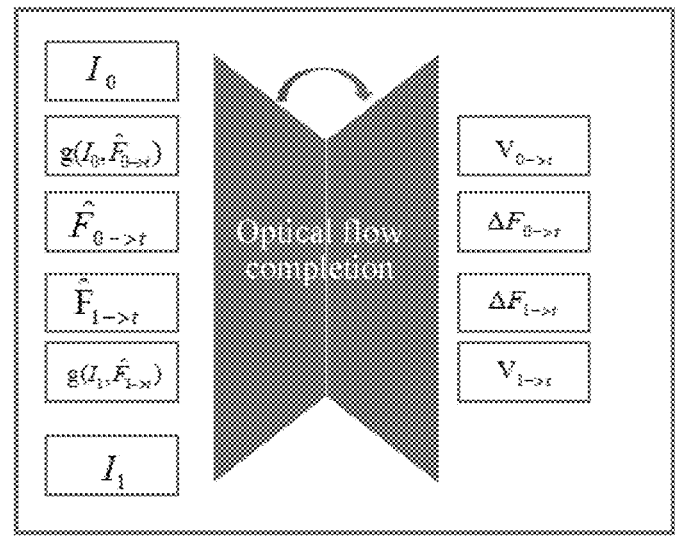
FIG. 4 is a schematic diagram of input and output of a convolutional neural network according to an embodiment of the disclosure.

Specifically, in this embodiment, U-NET takes a first face image and an initial optical flow map and an initial deformation map that correspond to the first face image as input and takes an optical flow increment map and a visibility probability map that correspond to the first face image as output. FIG. 4 is a schematic diagram of input and output of a convolutional neural network. In the example, the convolutional neural network adopts a U-NET network structure. $I_0$ and $I_1$ respectively represent two first face images, $\hat{F}_{0 \to t}$ and $\hat{F}_{1 \to t}$ respectively represent initial optical flow maps respectively corresponding to $I_0$ and $I_1$, $g(I_0, \hat{F}_{0 \to t})$ and $g(I_1, \hat{F}_{1 \to t})$ respectively represent initial deformation maps respectively corresponding to $I_0$ and $I_1$, $\Delta F_{0 \to t}$ and $\Delta F_{1 \to t}$ respectively represent optical flow increment maps respectively corresponding to $I_0$ and $I_1$, and $V_{0 \to t}$ and $V_{1 \to t}$ respectively represent visibility probability maps respectively corresponding to $I_0$ and $I_1$. The convolutional neural network takes $I_0$, $I_1$, $\hat{F}_{0 \to t}$, $\hat{F}_{1 \to t}$, $g(I_0, \hat{F}_{0 \to t})$, and $g(I_1, \hat{F}_{i \to t})$ as input, and $\Delta F_{0 \to t}$, $\Delta F_{1 \to t}$, $V_{0 \to t}$ and $V_{1 \to t}$ as output.

An embodiment of the disclosure further provides an implementation of training a convolutional neural network. Specifically, a server determines a first training sample set. Each training sample in the first training sample set includes at least one set of image data and label data corresponding to the image data. The image data includes a first sample face image and an initial optical flow map and an initial deformation map that correspond to the first sample face image. The initial deformation map corresponding to the first sample face image is obtained by deforming the first sample face image according to the initial optical flow map corresponding to the first sample face image. The label data includes an optical flow increment map and a visibility probability map that are calibrated. Then, the server performs network training through training samples in the first training sample set, to obtain the convolutional neural network. For example, the server trains a U-NET network through the training samples in the first training sample set, to obtain the convolutional neural network.

S205: Generate the target face image according to the first face image and the initial optical flow map, the optical flow increment map, and the visibility probability map that correspond to the first face image.

In an example embodiment, the server may perform, according to the optical flow increment map corresponding to the first face image, optical flow completion on the initial optical flow map corresponding to the first face image, to obtain a target optical flow map corresponding to the first face image, then deform, according to the target optical flow map corresponding to the first face image, the first face image to obtain a target deformation map corresponding to the first face image, and generate the target face image according to the target deformation map and the visibility probability map that correspond to the first face image.

In an example embodiment, when the first reference element includes one first face image, the target face image may be determined by the product of a target deformation map and a visibility probability map that correspond to the first face image.

When the first reference element includes a plurality of first face images, the target face image may be determined in the following manner:

determining, according to visibility probability maps corresponding to the first face images, weights of target deformation maps corresponding to the first face images, and performing, by using the weights, weighted average on the target deformation maps corresponding to the first face images, to obtain the target face image.

Illustration is provided below with an example in which the first reference element includes two different first face images.

Still taking FIG. 2B as an example, optical flow completion is performed on the initial optical flow map 213 according to the optical flow increment map 215 corresponding to the first face image 211, to obtain a target optical flow map corresponding to the first face image 211. A target deformation map 217 may be obtained by deforming the first face image 211 according to the target optical flow map. Then, a target face image 218 may be generated according to the target deformation map 217 and the visibility probability map 216.

Taking the convolutional neural network in FIG. 4 as an example, the server performs according to an initial optical flow map $\Delta F_{0 \to t}$ corresponding to $I_0$ (e.g., the first face image 211), optical flow completion on the initial optical flow map $\hat{F}_{0 \to t}$ to obtain a target optical flow map $F_{0 \to t}$ corresponding to $I_0$, performs optical flow completion according to an initial optical flow map $\hat{F}_{1 \to t}$ corresponding to $I_1$ (e.g., the first face image 211) to obtain a target optical flow map $F_{1 \to t}$ corresponding to $I_1$, then deforms $I_0$ according to $F_{0 \to t}$ to obtain a target deformation map $g(I_0, F_{0 \to t})$ corresponding to $I_0$, and deforms $I_1$ according to $F_{1 \to t}$ to obtain a target deformation map $g(I_1, F_{1 \to t})$ corresponding to $I_1$. The server may multiply the visibility probability maps corresponding to the first face images by values at corresponding positions of the target deformation maps corresponding to the first face images, sum calculation results of the first face images, and then divide the summation result by the sum of the visibility probability maps corresponding to the first face images, so as to generate the target face image. The target face image may be represented by the following formula:

$$\hat{I}_t = (V_0 \odot g(I_0, F_{0 \to t}) + V_1 \odot g(I_1, F_{1 \to t}))/(V_0 + V_1) \quad (5)$$

where $\hat{I}_t$ represents the target face image, $V_0$ and $V_1$ respectively represent the visibility probability maps corresponding to the first face images $I_0$ and $I_1$, $g(I_0, F_{0 \to t})$ and $g(I_1, F_{1 \to t})$ respectively represent the target deformation maps corresponding to $I_0$ and $I_1$, and $\odot$ represents multiplication on the corresponding positions of the two images.

It would be understood that when the first reference element includes n first face images, the target face image may be generated through the following formula (6):

$$\hat{I}_t = (V_0 \odot g(I_0, F_{0 \to t}) + V_1 \odot g(I_1, F_{1 \to t}) + \ldots + V_{n-1}$$

$$\odot g(I_{n-1}, F_{n-1 \to t}))/V_0 + V_1 + \ldots + V_{n-1}) \quad (6)$$

where n is a positive integer greater than 1, $I_{n-1}$ represents the $n^{th}$ first face image in the first reference element, $V_{n-1}$ represents a visibility probability map corresponding to $I_{n-1}$, and $g(I_{n-1}, F_{n-1 \to t})$ represents a target deformation map corresponding to $I_{n-1}$. Meanings of other elements in the formula (6) may be obtained with reference to the formula (5).

As described above, the example embodiment of the disclosure provides a face image generation method. In the method, a target face image is generated based on an optical flow map. Specifically, according to a first face image in a first reference element, a 3DMM corresponding to the first face image is determined as a first model. According to a second reference element used for representing a posture and/or an expression of a target face image, a 3DMM corresponding to the second reference element is determined as a second model. An initial optical flow map corresponding to the first face image is then determined according to the first model and the second model. The method, on one hand, achieves parameterized control through the 3DMMs, and on the other hand, retains identity shape information of an original image through the initial optical flow map. Next, a corresponding initial deformation map is obtained by deforming the first face image according to the initial optical flow map, an optical flow increment map and a visibility probability map that correspond to the first face image are obtained through a convolutional neural network, and then the target face image is generated according to the first face image and the initial optical flow map, the optical flow increment map, and the visibility probability map that correspond to the first face image, so that the method retains more details of the original image in the generated target face image, thereby the target face image being more realistic and natural. In addition, the method does not rely on a single network, but implement the corresponding functions through different small networks, thereby greatly reducing a parameter space, reducing model complexity, and improving generalization performance. In a practical application, the method may generate a natural and realistic face image.

In some example embodiments, the server may also optimize the target face image through a generative adversarial network model, to obtain the optimized target face image outputted by the generative adversarial network model. The generative adversarial network model may further improve artificial texture generated during the deformation and invisible regions in the target deformation map, and thus may generate a natural and realistic face image.

Figure 5A:
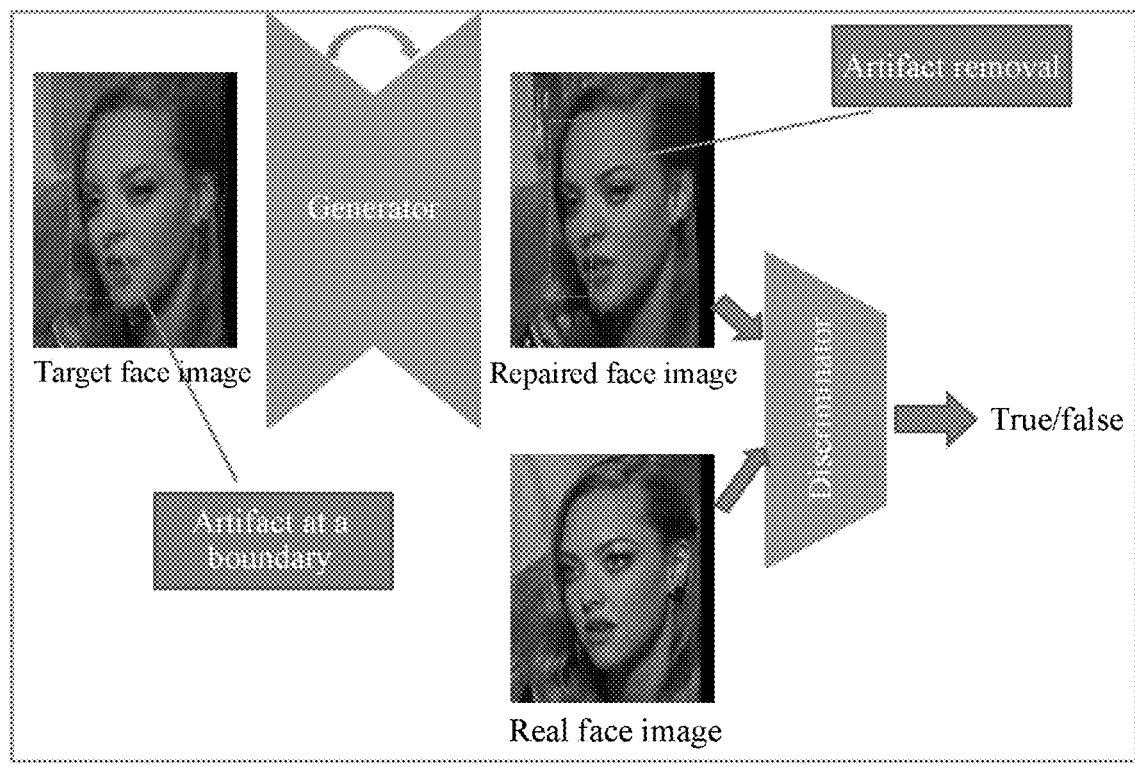
FIG. 5A is a schematic structural diagram of a generative adversarial network model according to an embodiment of the disclosure.

In an example embodiment, a structure of the generative adversarial network model includes a generator and a discriminator. Referring to a schematic structural diagram of a generative adversarial network model shown in FIG. 5A, the generator is configured to generate an improved image, and takes the target face image generated in S205 as input and the image after improvement of artificial texture and invisible regions as output. As shown in FIG. 5A, an inputted image is the target face image generated based on S205, and deformation (artifact) exists in a boundary position. After the inputted image passes through the generator of the generative adversarial network model, a repaired face image may be generated. The discriminator is configured to determine whether the image generated by the generator is real. Specifically, the discriminator takes the image generated by the generator as input to determine whether the image is a real face image. If the image is a real face image, the image is outputted as an optimized target face image. If the image is not a real face image, an improved image is re-generated, and a corresponding discrimination operation is performed, till the image generated by the generator is determined by the discriminator to be a real face image.

Figure 5B:
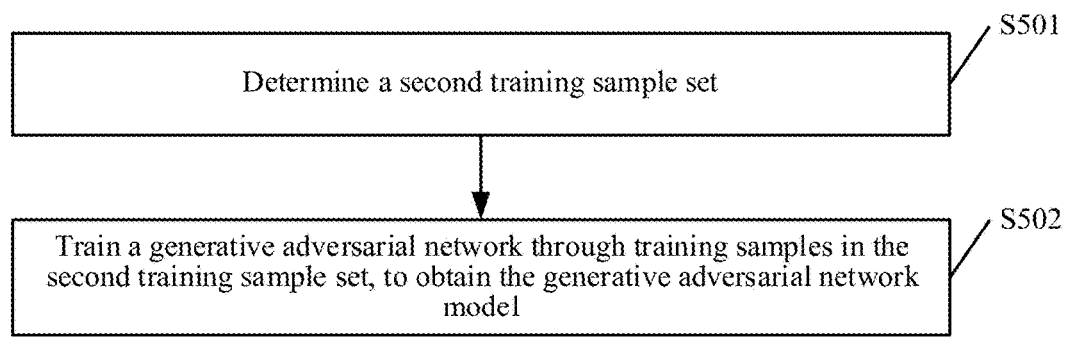
FIG. 5B is a flowchart of a generative adversarial network model training method according to an embodiment of the disclosure.

In a practical application, an embodiment of the disclosure further provides an exemplary implementation of training a generative adversarial network model. Referring to a flowchart of a generative adversarial network model training method shown in FIG. 5B, the method includes S501-S502:

S501: Determine a second training sample set.

Each training sample in the second training sample set includes a second sample face image and a calibrated face image corresponding to the second sample face image. The second sample face image refers to an image generated according to an initial sample face image and an initial optical flow map, an optical flow increment map, and a visibility probability map that correspond to the initial sample face image. The calibrated face image refers to a pre-calibrated real face image.

For ease of understanding, training samples in the second training sample set are described below in some examples. In one example, the initial sample face image is a head tilted 15° to the left, and a facial expression is a smiling face image. The second sample face image refers to a face image generated based on the face image generation method according to the embodiment shown in FIG. 2A. In the second sample face image, a person's head is tilted 30° to the right, and the facial expression is mournful and the calibrated face image is an image taken when the person's head is tilted 30° to the right and the facial expression is mournful.

S502: Train a generative adversarial network through training samples in the second training sample set, to obtain the generative adversarial network model.

In an example embodiment, the server takes a pixel error and an adversarial loss function as a loss function, and trains the generative adversarial network by using the training samples in the second training sample set, to obtain the generative adversarial network model.

The foregoing are some an example embodiments of the face image generation method according to the embodiment of the disclosure. For ease of understanding, the face image generation method according to the embodiment of the disclosure is introduced below from the perspective of a product application.

It would be understood that the face image generation method according to the embodiment of the disclosure may be applied to many fields through an artificial intelligence (AI) technology. For example, the face image generation method may be applied to the field of social networking or video clipping. A plurality of target face images are synthesized according to a first face image, and dynamic short videos or dynamic expressions are generated based on a variety of different target face images. Moreover, the face image generation method is applied to scenarios such as virtual UP, movie special effects, and procedural composition.

The following is a detailed description of product-side application of the face image generation method according to the embodiment of the disclosure.

In some example embodiments, the second reference element includes a plurality of sets of ordered target model parameters or a plurality of ordered second face images from a designated video or a plurality of ordered second face images from designated animation. In response to the second reference element including the plurality of sets of ordered target model parameters, for each set of ordered target model parameters, a 3DMM corresponding to the target model parameters is sequentially determined as a second model corresponding to the target model parameters. In response to the second reference element including the plurality of ordered second face images, for each second face image, a 3DMM corresponding to the second face image is sequentially determined as a second model corresponding to the second face image.

Then, the server sequentially performs, for each of the second models, the operation of determining, according to the first model and the second model, an initial optical flow map corresponding to the first face image. In this way, a plurality of initial optical flow maps may be obtained, and then a plurality of ordered target face images may be generated. The server may generate an ordered image set according to a sequence of each second model and a target face image generated based on each second model. The ordered image set may be videos, dynamic expressions, or the like. This embodiment does not limit the form of the ordered image set.

Figure 6:
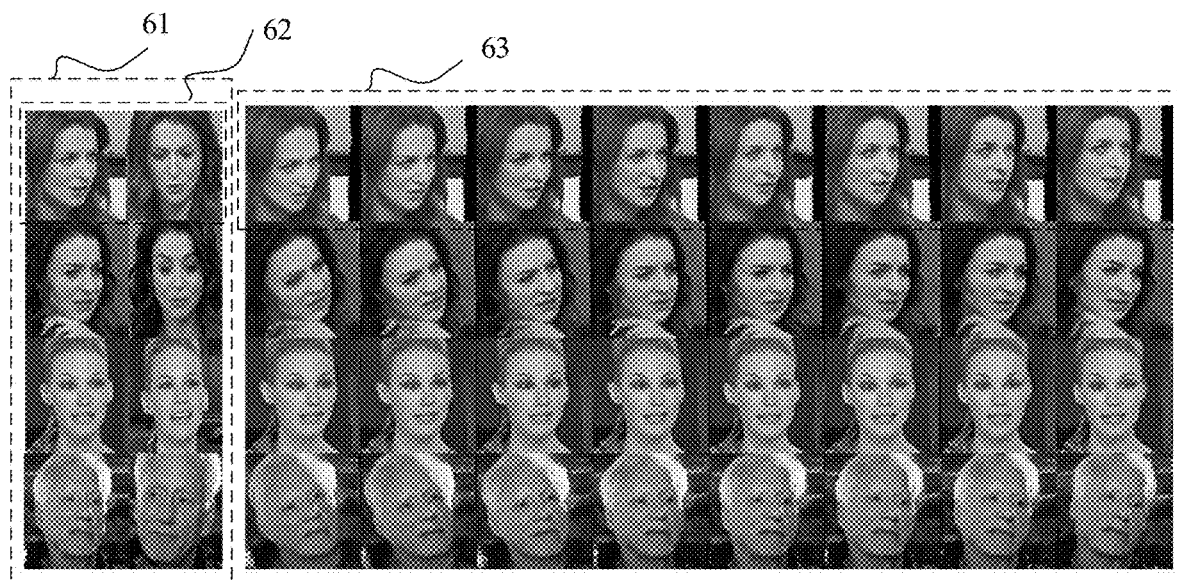
FIG. 6 is a schematic effect diagram of generating a target face image according to an embodiment of the disclosure.

When the second reference element includes a target model parameter, the target face image and the first face image generated based on the foregoing method are face images belonging to the same person, and the server may generate, based on a plurality of ordered target face images, videos or memes corresponding to the person. FIG. 6 shows a schematic effect diagram of generating a target face image. Referring to FIG. 6, the server uses the first and second columns of images (as shown by 61 in FIG. 6) as input to generate target face images in different postures. For example, the first row of images (as shown by 62 in FIG. 6) in the first and second columns of images are inputted images, and a corresponding first model may be determined based on each of the inputted images 62. A corresponding second model may be determined based on a target model parameter. An initial optical flow map corresponding to each of the images 62 may be determined according to the first model and the second model. A corresponding initial deformation map may be obtained by deforming each of the images 62 according to the initial optical flow map. Then, a corresponding optical flow increment map and a corresponding visibility probability map may be obtained through a convolutional neural network according to the initial optical flow map and the initial deformation map, with respect to each of the images 62. A target face image (as shown by 63 in FIG. 6) may be generated according to each of the images 62 and the initial optical flow map, the optical flow increment map, and the visibility probability map that correspond to each of the images 62. Since the plurality of target face images in different postures reflect a process of a person's head changing from one angle to another angle, the server may generate, based on the plurality of target face images, videos or dynamic expressions of the person's head changing from one angle to another angle.

When the second reference element includes a second face image, the second face image and the first face image may be face images belonging to the same person or face images belonging to different persons. When the second face image and the first face image are face images belonging to the same person, the effect of generating a target face image is similar to that in FIG. 6. When the second face image and the first face image are face images belonging to different persons, the server may generate a target face image different from the first face image in a posture and/or an expression, and may generate, based on the plurality of ordered target face images, videos or memes corresponding to the person in the first face image.

Specifically, the first face image may be a face image of a public figure, for example, a face image of a star (or celebrity). The second face image may be any face image with a designated posture and/or a designated expression. For example, the second face image may be a face image of a non-public figure with a designated posture and/or a designated expression. In this way, a target face image of a public figure with a designated posture and/or a designated expression may be generated based on the face image generation method according to the embodiment of the disclosure, and videos or dynamic expressions of the public figure may be generated according to a plurality of target face images of the public figure with designated postures and/or designated expressions.

Figure 7:
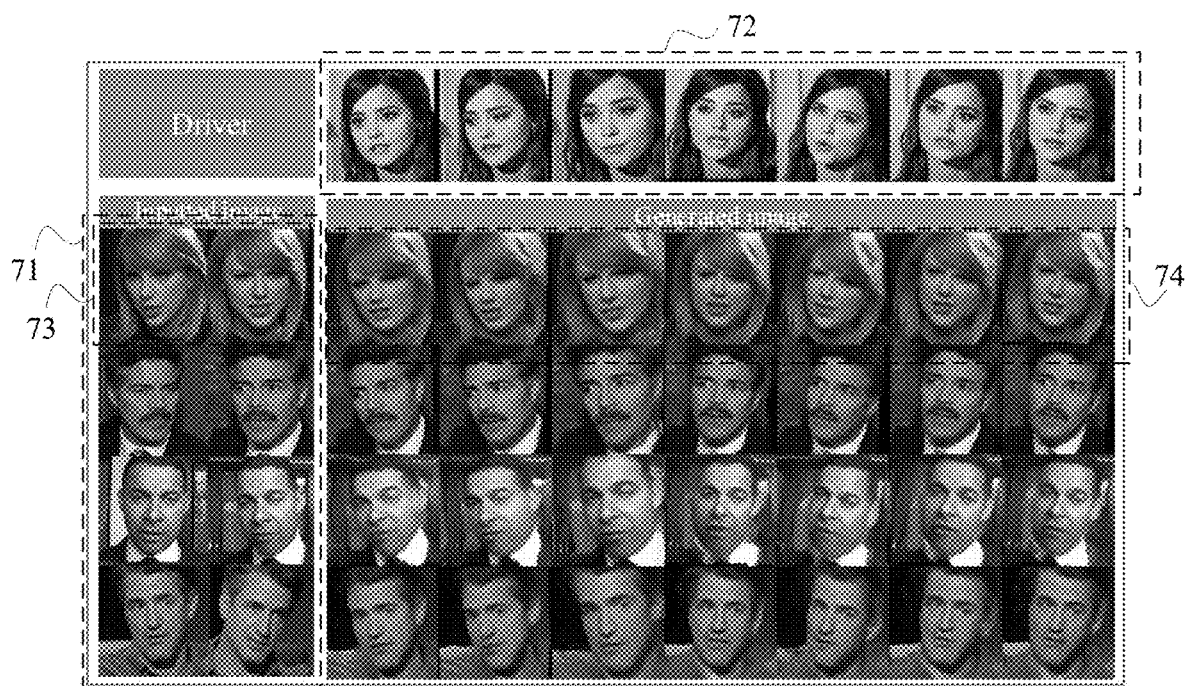
FIG. 7 is a schematic effect diagram of generating a target face image according to an embodiment of the disclosure.

FIG. 7 shows a schematic effect diagram of generating a target face image. In an example, the server takes first two columns of images (as shown by 71 in FIG. 7) as an inputted image and the first row of images (as shown by 72 in FIG. 7) as drivers to generate the target face image. Specifically, two images 73 included in the first row of images in 71 are taken as a first reference element, and a plurality of images included in 72 are taken as a second reference element. A plurality of ordered target face images 74 corresponding to the first reference element and the second reference element are generated respectively for the first reference element and the second reference element. The target face images and the first face images in the first reference element belong to the same person and postures and expressions of the person in the target face images are the same as those in the second face images. In this way, the server may generate, based on the plurality of target face images, videos or dynamic expressions related to the person in the first face image.

After generating the ordered image set, the server may further receive a share instruction for the ordered image set, and share the ordered image set according to the share instruction, so as to attract users and increase user activity.

In live broadcast application scenarios or social network application scenarios, users are often required to configure avatars. The method according to the embodiment of the disclosure may also be used to achieve avatar customization according to actual demands of the users. Specifically, the server generates a corresponding target face image in response to a user request, and then transmits the target face image to a terminal to instruct the terminal to display the target face image as a social network avatar (e.g., as an avatar in a social network application) of the user.

When the face image generation method according to the embodiment of the disclosure is performed by the terminal, the terminal, after generating a target face image, sets the target face image to a social network avatar of a user, and displays the social network avatar on an avatar display interface.

In order to make the technical solution of the disclosure clearer, the face image generation method according to the disclosure is described below in combination with an application scenario of video clipping.

Figure 8A:
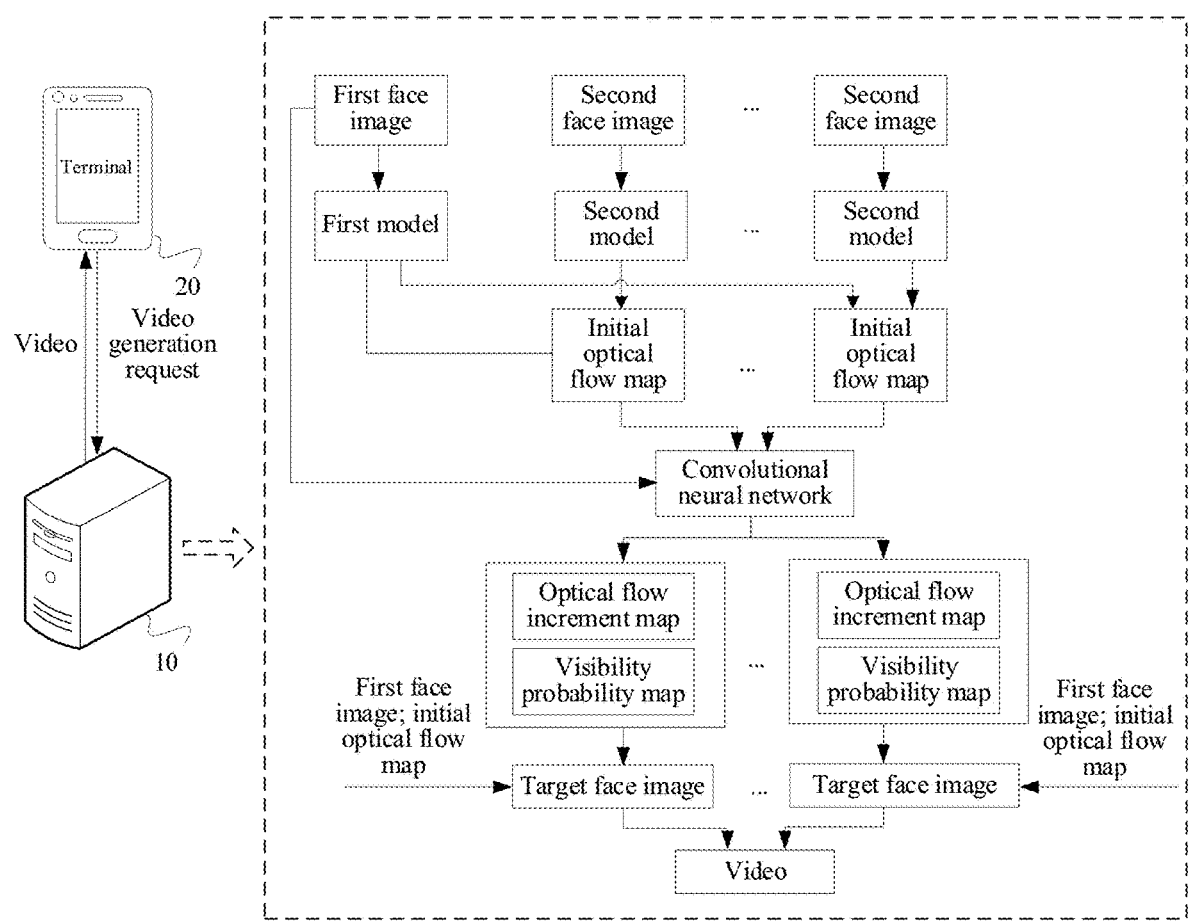
FIG. 8A is a schematic diagram of an application scenario of a face image generation method according to an embodiment of the disclosure.

Referring to a schematic diagram of an application scenario of a face image generation method shown in FIG. 8A, the application scenario includes a server 10 and a terminal 20. A user transmits a video generation request to the server 10 through the terminal 20. The video generation request carries a first reference element and a second reference element. The first reference element includes a first face image. The first face image is specifically a face image of a star. The second reference element includes a plurality of second face images. The second face images may be face images taken when the user displays different postures and expressions. The server 10, after receiving the video generation request, generates a plurality of ordered target face images by using the face image generation method according to the embodiment of the disclosure. The target face images are specifically face images in which the star displays the foregoing postures and expressions. Further, the server 10 generates, by using the plurality of target face images, videos in which the star displays the foregoing postures and expressions.

Specifically, the server 10 detects face key point coordinates in the first face image, then obtains model parameters through a neural network model according to the face key point coordinates and the first face image, and determines, according to the model parameters, a 3DMM corresponding to the first face image, i.e., a first model.

Then, for each second face image, the server 10, in the same manner as generating the first model, detects face key point coordinates in the second face image, obtains model parameters through a neural network model according to the face key point coordinates and the second face image, and determines, according to the model parameters, a 3DMM corresponding to the second face image, i.e., a second model. In the example, each second face image corresponds to a second model.

Next, the server 10, according to a PNCC algorithm, projects the first model to obtain an inputted PNCC image, projects the second model to obtain a target PNCC image, then searches the inputted PNCC image and the target PNCC image for pixel points with a minimum pixel difference as corresponding points, calculates pixel differences between each set of corresponding points, and generates an initial optical flow map according to the pixel differences between each set of corresponding points. In this way, an initial optical flow map may be obtained for each second model. For each initial optical flow map, the server 10 may deform a first face image by using the initial optical flow map to obtain an initial deformation map corresponding to the first face image, so that the server 10 may obtain a plurality of initial deformation maps by deformation.

Once again, the server 10 performs optical flow completion and correction through a convolutional neural network. Specifically, the server 10 adopts a U-NET structure to train the convolutional neural network. The convolutional neural network takes a first face image and an initial optical flow map and an initial deformation map that correspond to the first face image as input and takes an optical flow increment map and a visibility probability map that correspond to the first face image as output. In this way, the server 10 may superimpose the initial optical flow map and the optical flow increment map to obtain a target optical flow map, deform the first face image according to the target optical flow map corresponding to the first face image to obtain a target deformation map corresponding to the first face image, and generate a target face image according to the target deformation map and the visibility probability map that correspond to the first face image. Since the second reference element includes a plurality of second face images, the server 10 may generate a plurality of target optical flow maps one-to-one corresponding to the second face images, and then generate a plurality of target face images one-to-one corresponding to the second face images.

Finally, the server 10 inputs the foregoing plurality of target face images into a pre-trained generative adversarial network model, to eliminate artificial texture and invisible regions, thereby optimizing the target face images. The server 10 acquires the optimized target face images, generates, according to the optimized target face images, a video in which the star displays the foregoing postures and expressions, and returns the video to the terminal 20.

Figure 8B:
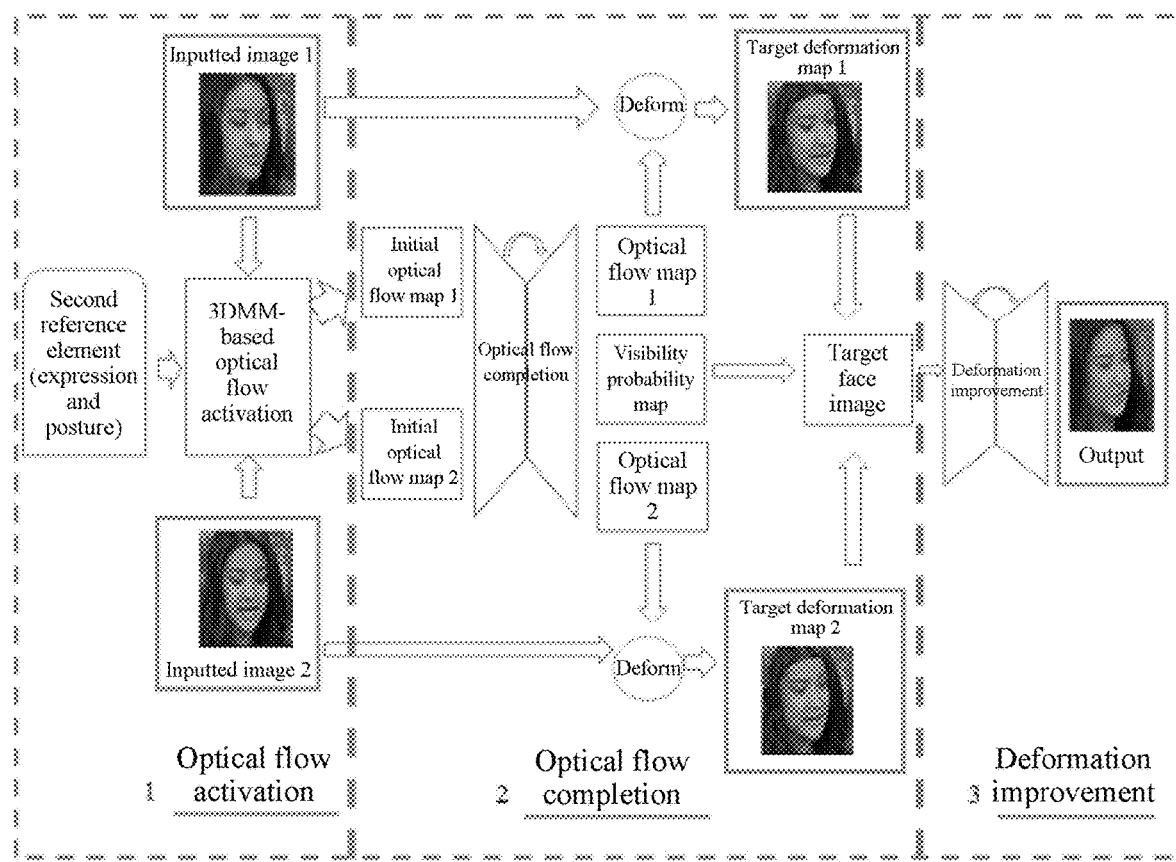
FIG. 8B is a schematic diagram of another application scenario of a face image generation method according to an embodiment of the disclosure.

The following is another example illustrating the application of the face image generation method according to the disclosure with reference to FIG. 8B.

During implementation, the face image generation method according to the disclosure may include three stages: optical flow activation, optical flow completion, and deformation improvement. FIG. 8B describes an example embodiment of the foregoing three stages with an example in which a target face image of a user in a target posture and a target expression is obtained by synthesis based on two face images of the user.

Referring to FIG. 8B, in the stage of optical flow activation, two first face images (an inputted image 1 and an inputted image 2), i.e., a first reference element, are inputted, and a second reference element representing a posture and an expression of a target face image is inputted, to obtain first models corresponding to the two first face images and a second model corresponding to the second reference element. The foregoing models are projected to obtain corresponding PNCC images. For the PNCC image corresponding to each first model, the PNCC image and the target PNCC image are searched for points with a minimum pixel difference as corresponding points, and an initial optical flow map may be generated based on the pixel differences between each set of corresponding points, so that the initial optical flow maps (an initial optical flow map 1 and an initial optical flow map 2) corresponding to the first face images may be obtained.

In the stage of optical flow completion, optical flow increment maps and visibility probability maps corresponding to the inputted images are obtained through a convolutional neural network. Optical flow maps (an optical flow map 1 and an optical flow map 2) corresponding to the inputted images may be obtained based on the initial optical flow maps and the optical flow increment maps. Target deformation maps corresponding to the inputted images may be obtained by deforming the inputted images according to the optical flow maps. Then, based on the visibility probability map outputted by the convolutional neural network, a target deformation map 1 and a target deformation map 2 are combined to obtain the target face image.

In the stage of deformation improvement, the target face image is inputted to a generative adversarial network model, and artificial texture, artifacts, and invisible regions in the target face image may be optimized to generate an optimized target face image. If the optimized target face image is determined to be true (or real) by the discriminator, the optimized target face image is outputted.

Based on the an example embodiment of the face image generation method according to the embodiments of the disclosure, an embodiment of the disclosure further provides a face image generation apparatus. The apparatus is introduced below from the perspective of functional modularization.

Figure 9:
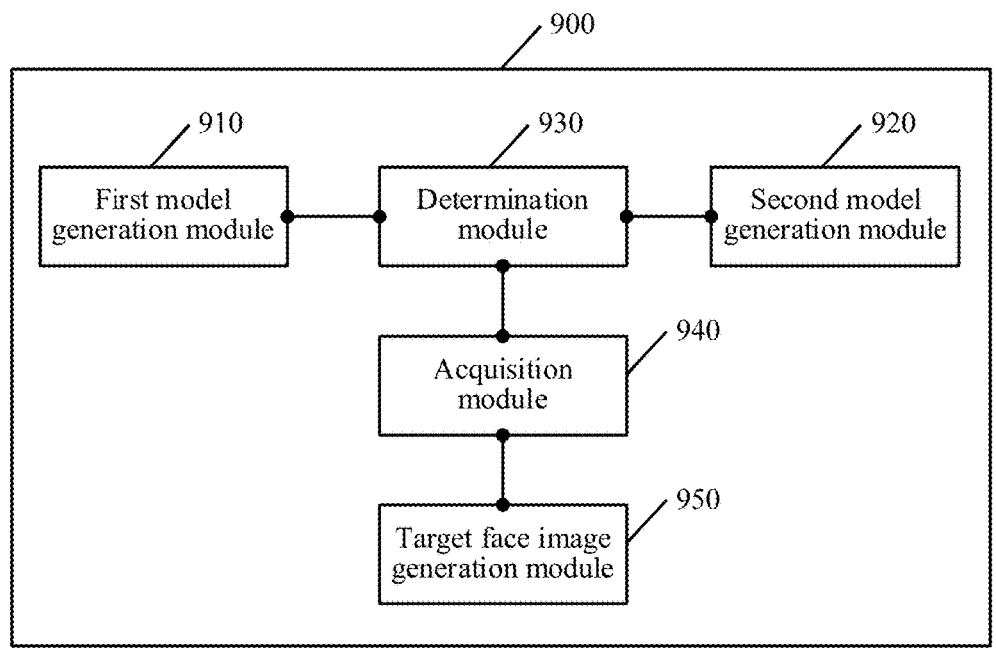
FIG. 9 is a schematic structural diagram of a face image generation apparatus according to an embodiment of the disclosure.

Referring to a schematic structural diagram of a face image generation apparatus shown in FIG. 9, the apparatus 900 includes:

a first model generation module 910, configured to determine, according to a first face image in a first reference element, a 3DMM corresponding to the first face image as a first model;

a second model generation module 920, configured to determine, according to a second reference element, a 3DMM corresponding to the second reference element as a second model; the second reference element being used for representing a posture and/or an expression of a target face image;

a determination module 930, configured to determine, according to the first model and the second model, an initial optical flow map corresponding to the first face image, and deform the first face image according to the initial optical flow map to obtain an initial deformation map corresponding to the first face image;

an acquisition module 940, configured to obtain, through a convolutional neural network according to the first face image and the initial optical flow map and the initial deformation map that correspond to the first face image, an optical flow increment map and a visibility probability map that correspond to the first face image; and a target face image generation module 950, configured to generate the target face image according to the first face image and the initial optical flow map, the optical flow increment map, and the visibility probability map that correspond to the first face image.

Figure 10:
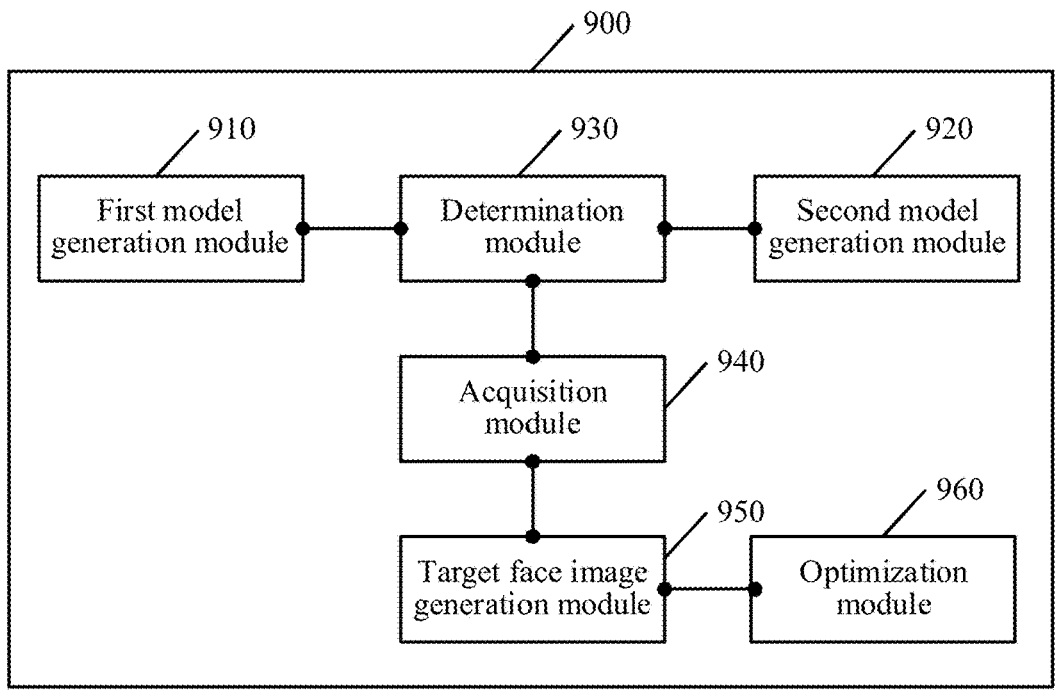
FIG. 10 is a schematic structural diagram of a face image generation apparatus according to an embodiment of the disclosure.

FIG. 10 is a schematic structural diagram of a face image generation apparatus according to an embodiment of the disclosure. Based on the structure shown in FIG. 9, the apparatus 900 further includes:

an optimization module 960, configured to optimize the target face image through a generative adversarial network model, to obtain the optimized target face image outputted by the generative adversarial network model.

In an example embodiment, the second model generation module 920 is specifically configured to:

in response to the second reference element including a target model parameter, determining, according to the target model parameter, a 3DMM corresponding to the target model parameter as the second model.

In an example embodiment, the second model generation module 920 is specifically configured to:

in response to the second reference element including a second face image, determine, according to the second face image, a 3DMM corresponding to the second face image as the second model;

the second face image being different from the first face image.

Figure 11:
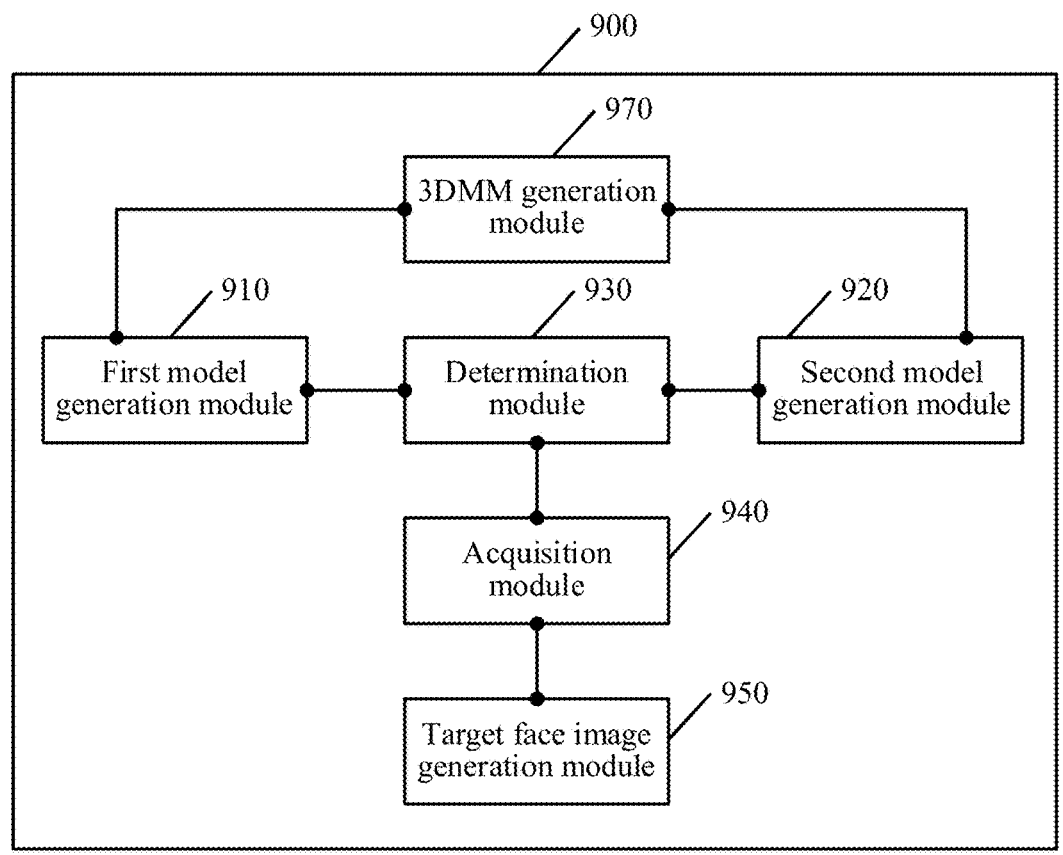
FIG. 11 is a schematic structural diagram of a face image generation apparatus according to an embodiment of the disclosure.

FIG. 11 is a schematic structural diagram of a face image generation apparatus according to an embodiment of the disclosure. Based on the structure shown in FIG. 9, the apparatus 900 further includes:

a 3DMM generation module 970, configured to detect face key point coordinates in the first face image; construct an initial 3DMM according to an average face (or average face image), and project three-dimensional coordinates of the initial 3DMM to a two-dimensional image to obtain projection coordinates; and determine a first model parameter minimizing a distance between the face key point coordinates and the projection coordinates, and determine, according to the first model parameter, a 3DMM corresponding to the first face image. The average face image may be a synthetic face image obtained by extracting features from a number of face images.

The face image generation apparatus further includes the 3DMM generation module 970 based on the structure shown in FIG. 10, which is not limited in this embodiment.

In an example embodiment, the 3DMM generation module 970 determines the 3DMM corresponding to the first face image in the following manner:

detecting face key point coordinates in the first face image;

obtaining, according to the face key point coordinates and the first face image, a second model parameter through a neural network model; and determining, according to the second model parameter, the 3DMM corresponding to the first face image.

In an example embodiment, the target face image generation module 950 is specifically configured to:

perform, according to the optical flow increment map corresponding to the first face image, optical flow completion on the initial optical flow map corresponding to the first face image, to obtain a target optical flow map corresponding to the first face image;

deform, according to the target optical flow map corresponding to the first face image, the first face image to obtain a target deformation map corresponding to the first face image; and generate the target face image according to the target deformation map and the visibility probability map that correspond to the first face image.

Figure 12:
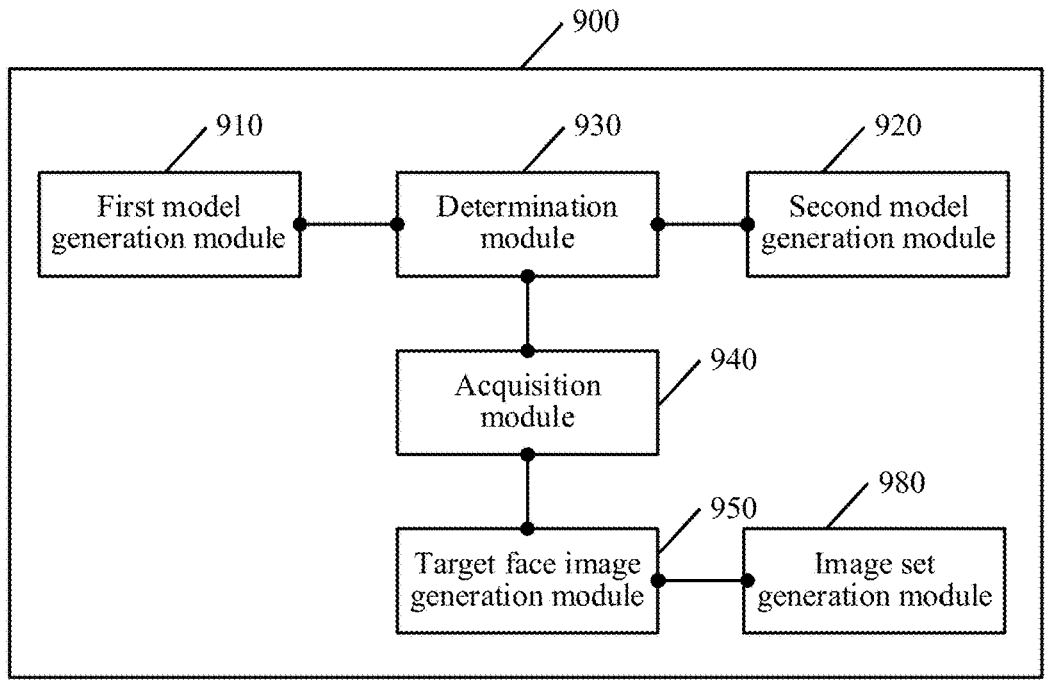
FIG. 12 is a schematic structural diagram of a face image generation apparatus according to an embodiment of the disclosure.

FIG. 12 is a schematic structural diagram of a face image generation apparatus according to an embodiment of the disclosure. Based on the structure shown in FIG. 9, the second reference element includes a plurality of sets of ordered target model parameters or a plurality of ordered second face images.

The second model generation module 920 is specifically configured to:

in response to the second reference element including the plurality of sets of ordered target model parameters, sequentially determine, for each set of target model parameters, a 3DMM corresponding to the target model parameters as a second model corresponding to the target model parameters; and in response to the second reference element including the plurality of ordered second face images, sequentially determine, for each second face image, a 3DMM corresponding to the second face image as a second model corresponding to the second face image.

The determination module 930 is specifically configured to:

sequentially perform, for each of the second models, the following operation:

determining, according to the first model and the second model, an initial optical flow map corresponding to the first face image.

In an example embodiment, the apparatus 900 further includes:

an image set generation module 980, configured to generate an ordered image set according to a sequence of each second model and a target face image generated based on each second model.

Figure 13:
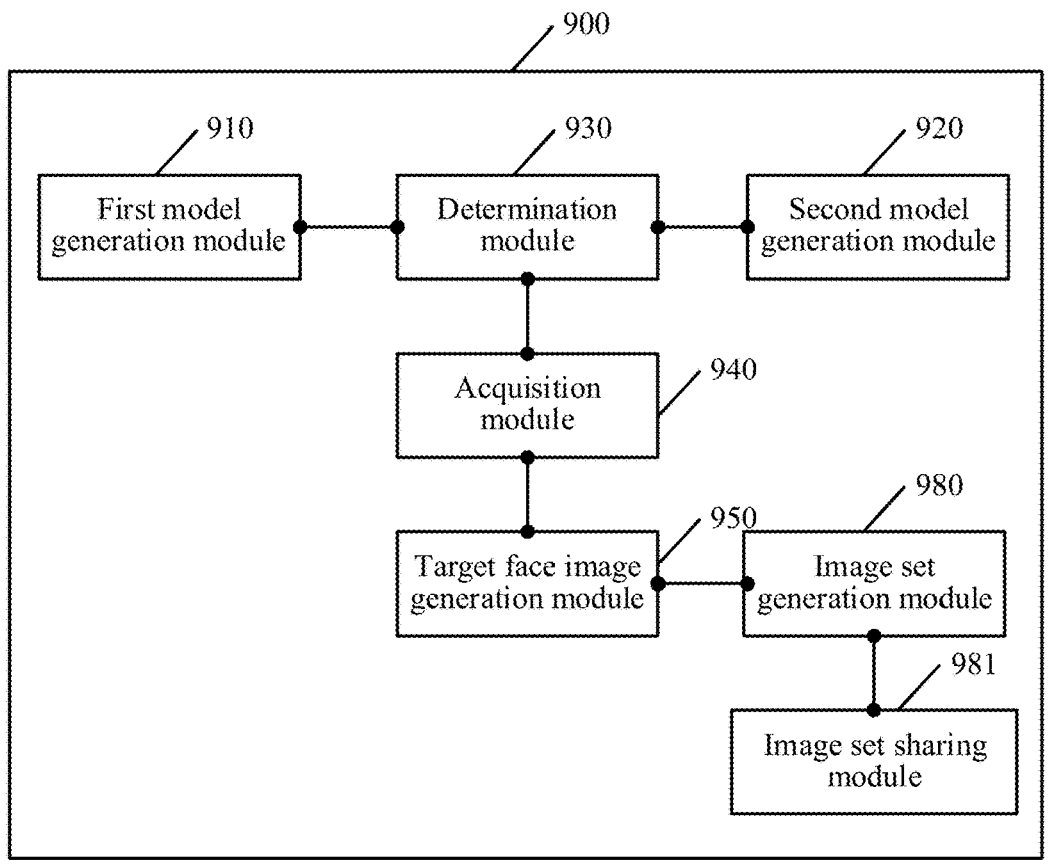
FIG. 13 is a schematic structural diagram of a face image generation apparatus according to an embodiment of the disclosure.

FIG. 13 is a schematic structural diagram of a face image generation apparatus according to an embodiment of the disclosure. Based on the structure shown in FIG. 12, the apparatus 900 further includes:

an image set sharing module 981, configured to receive a share instruction for the ordered image set, and share the ordered image set according to the share instruction.

Figure 14:
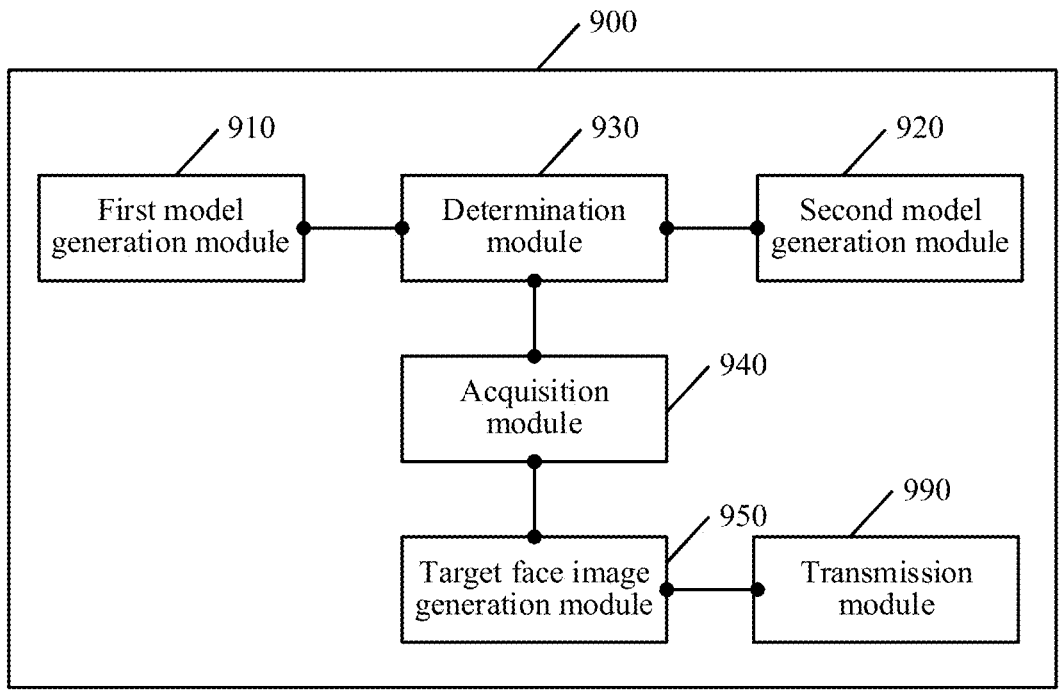
FIG. 14 is a schematic structural diagram of a face image generation apparatus according to an embodiment of the disclosure.

FIG. 14 is a schematic structural diagram of a face image generation apparatus according to an embodiment of the disclosure. Based on the structure shown in FIG. 9, the apparatus 900 further includes:

a transmission module 990, configured to transmit the target face image to a terminal, and instruct the terminal to display the target face image, e.g., as a social network avatar of a user.

In an example embodiment, the first reference element includes a plurality of different first face images belonging to the same person; and the first model generation module 910 is specifically configured to:

determine, for each first face image in the first reference element, the 3DMM corresponding to the first face image as the first model corresponding to the first face image.

Figure 15:
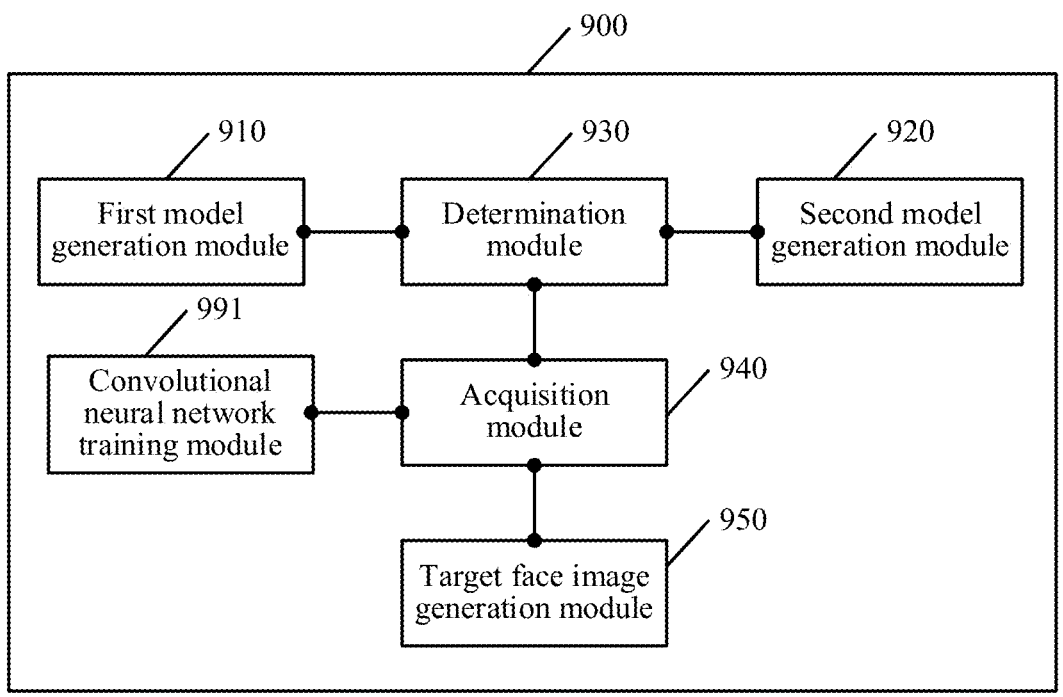
FIG. 15 is a schematic structural diagram of a face image generation apparatus according to an embodiment of the disclosure.

FIG. 15 is a schematic structural diagram of a face image generation apparatus according to an embodiment of the disclosure. Based on the structure shown in FIG. 9, the convolutional neural network adopts an encoder-decoder network structure; and the apparatus 900 further includes:

a convolutional neural network training module 991, configured to determine a first training sample set, each training sample in the first training sample set including at least one set of image data and label data corresponding to the image data, the image data including a first sample face image and an initial optical flow map and an initial deformation map that correspond to the first sample face image, and the initial deformation map corresponding to the first sample face image being obtained by deforming the first sample face image according to the initial optical flow map corresponding to the first sample face image; the label data including an optical flow increment map and a visibility probability map that are calibrated; and perform network training through training samples in the first training sample set, to obtain the convolutional neural network.

Figure 16:
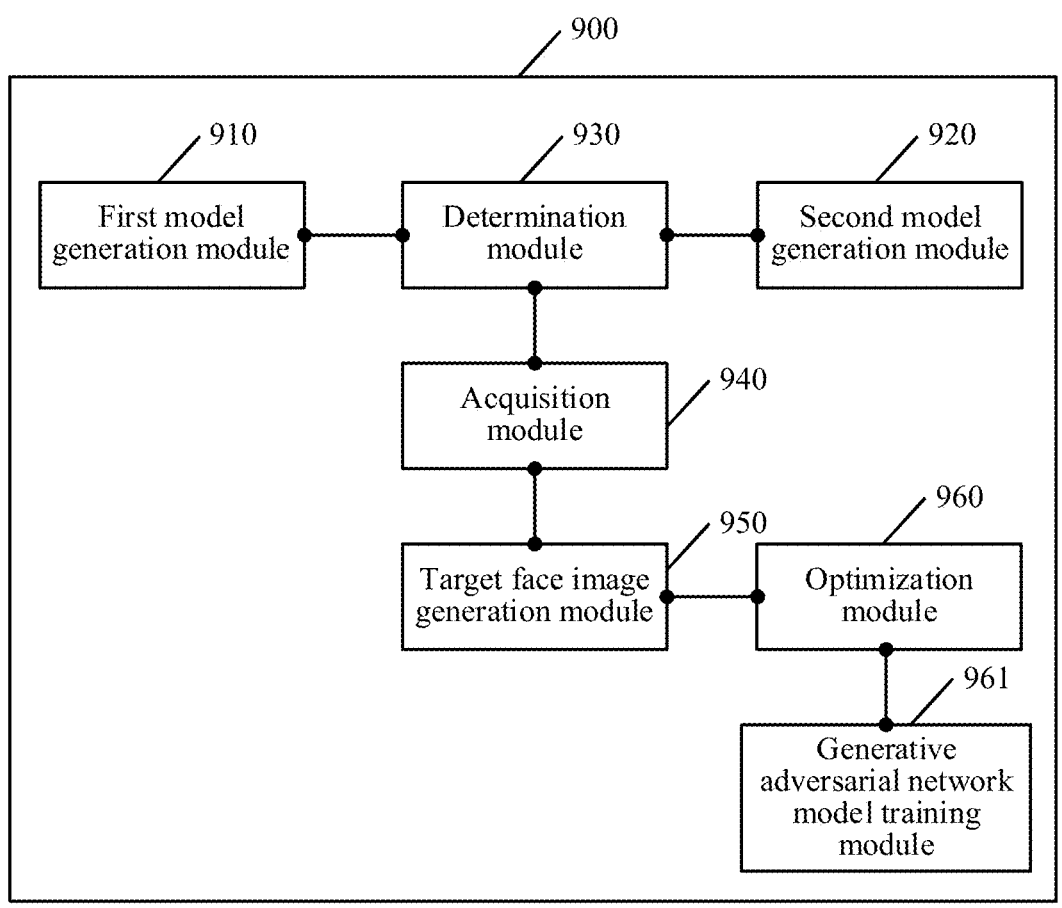
FIG. 16 is a schematic structural diagram of a face image generation apparatus according to an embodiment of the disclosure.

FIG. 16 is a schematic structural diagram of a face image generation apparatus according to an embodiment of the disclosure. Based on the structure shown in FIG. 10, the apparatus 900 further includes:

a generative adversarial network model training module 961, configured to determine a second training sample set, each training sample in the second training sample set including a second sample face image and a calibrated face image corresponding to the second sample face image; and train a generative adversarial network through training samples in the second training sample set, to obtain the generative adversarial network model.

An embodiment of the disclosure further provides a device for generating a face image. The device may be a server or a terminal. The device according to the embodiment of the disclosure is described in detail below from the perspective of hardware materialization.

Figure 17:
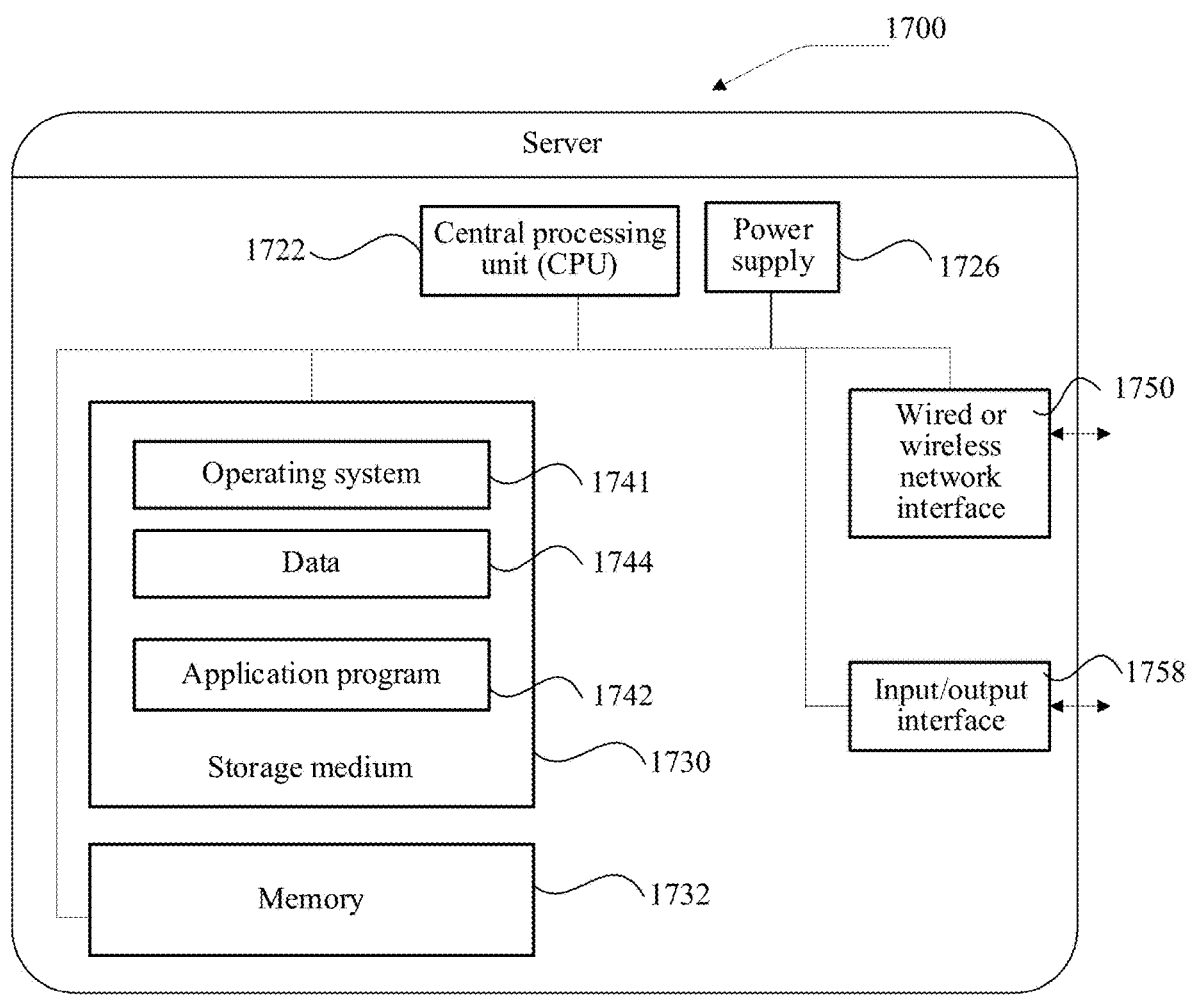
FIG. 17 is a schematic structural diagram of a server according to an embodiment of the disclosure.

FIG. 17 is a schematic structural diagram of a server according to an embodiment of the disclosure. The server 1700 may vary considerably due to different configuration or performance, and may include one or more central processing units (CPUs) 1722 (such as one or more processors), one or more memories 1732, and one or more storage media 1730 (such as one or more mass storage devices) for storing application programs 1742 or data 1744. The memories 1732 and the storage media 1730 may temporarily or persistently store the application programs 1742 or the data 1744. The programs storing in the storage media 1730 may include one or more modules (not shown in the figure), and each module may include a series of instructions to the server. Furthermore, the CPUs 1722 may be configured to be in communication with the storage media 1730 and to execute the series of instructions in the storage media 1730 on the server 1700.

The server 1700 may further include one or more power supplies 1726, one or more wired or wireless network interfaces 1750, one or more input/output interfaces 1758, and/or one or more operating systems 1741, such as Windows Server™, Mac OS X™, Unix™, Linux™, and FreeBSD™.

The operations performed by the server in the foregoing embodiment may be based on the structure of the server shown in FIG. 17.

The CPUs 1722 are configured to perform the following operations:

determining, according to a first face image in a first reference element, a 3DMM corresponding to the first face image as a first model;

determining, according to a second reference element, a 3DMM corresponding to the second reference element as a second model; the second reference element being used for representing a posture and/or an expression of a target face image;

determining, according to the first model and the second model, an initial optical flow map corresponding to the first face image, and deform the first face image according to the initial optical flow map to obtain an initial deformation map corresponding to the first face image;

obtaining, through a convolutional neural network according to the first face image and the initial optical flow map and the initial deformation map that correspond to the first face image, an optical flow increment map and a visibility probability map that correspond to the first face image; and generating the target face image according to the first face image and the initial optical flow map, the optical flow increment map, and the visibility probability map that correspond to the first face image.

In an example embodiment, the CPUs 1722 may be further configured to perform the operations in any implementation of the face image generation method according to the embodiments of the disclosure.

Figure 18:
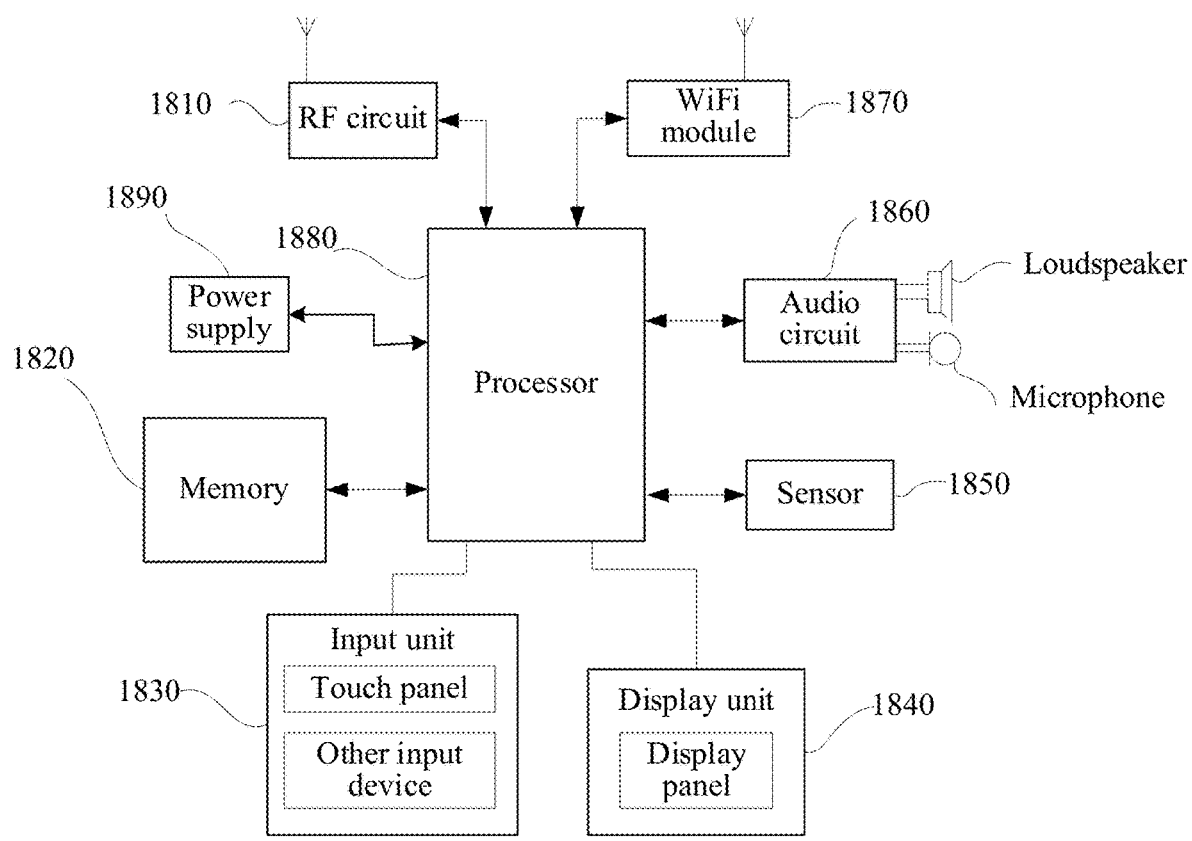
FIG. 18 is a schematic structural diagram of a terminal according to an embodiment of the disclosure.

An embodiment of the disclosure further provides another device for generating a face image. The device is a terminal as shown in FIG. 18. For ease of description, only a part related to the embodiment of the disclosure is shown. For specific technical details that are not disclosed, the foregoing descriptions of the method according to the embodiments of the disclosure may be referred to. The terminal may be any terminal device including a mobile phone, a tablet computer, a personal digital assistant (PDA), a point of sales (POS), a vehicle-mounted computer, or the like. For example, the terminal is a mobile phone.

FIG. 18 shows a block diagram of a partial structure of a mobile phone related to the terminal according to this embodiment of the disclosure. Referring to FIG. 18, the mobile phone includes components such as a radio frequency (RF) circuit 1810, a memory 1820, an input unit 1830, a display unit 1840, a sensor 1850, an audio circuit 1860, a Wireless Fidelity (WiFi) module 1870, a processor 1880, and a power supply 1890. A person skilled in the art would understand that the structure of the mobile phone shown in FIG. 18 does not constitute any limitation on the mobile phone, and instead, the mobile phone may include components more or fewer than those shown in the figure, or combine some components, or have a different component arrangement.

The memory 1820 may be configured to store a software program and a module. The processor 1880 runs the software program and the module that are stored in the memory 1820, so as to perform various function applications of the mobile phone and data processing. The memory 1820 may mainly include a program storage region and a data storage region. The program storage region may store an operating system, an application program (such as a sound play function or an image play function) that is required by at least one function, and the like. The data storage region may store data (such as audio data or a phonebook) that is created according to use of the mobile phone, and the like. In addition, the memory 1820 may include a high-speed random access memory, and may further include a nonvolatile memory, such as at least one magnetic disk storage device, a flash memory device, or another volatile solid-state storage device.

The processor 1880 performs a control of the mobile phone, is connected to each part of the entire mobile phone by using various interfaces and lines, and by running or executing the software program and/or the module that are/is stored in the memory 1820 and by invoking data stored in the memory 1820, performs various functions of the mobile phone and data processing, so as to perform overall monitoring on the mobile phone. In an example embodiment, the processor 1880 may include one or more processing units. An application processor and a modulation and demodulation processor may be integrated into the processor 1880. The application processor mainly processes an operating system, a user interface, an application program, and the like, and the modulation and demodulation processor mainly processes wireless communication. It would be understood that the modulation and demodulation processor may not be integrated into the processor 1880.

In this embodiment of the disclosure, the processor 1880 included in the terminal further performs the following operations:

determining, according to a first face image in a first reference element, a 3DMM corresponding to the first face image as a first model;

determining, according to a second reference element, a 3DMM corresponding to the second reference element as a second model; the second reference element being used for representing a posture and/or an expression of a target face image;

determining, according to the first model and the second model, an initial optical flow map corresponding to the first face image, and deform the first face image according to the initial optical flow map to obtain an initial deformation map corresponding to the first face image;

obtaining, through a convolutional neural network according to the first face image and the initial optical flow map and the initial deformation map that correspond to the first face image, an optical flow increment map and a visibility probability map that correspond to the first face image; and generating the target face image according to the first face image and the initial optical flow map, the optical flow increment map, and the visibility probability map that correspond to the first face image.

In an example embodiment, the processor 1880 may be further configured to perform the operations of any implementation of the face image generation method according to the embodiments of the disclosure.

An embodiment of the disclosure further provides a computer-readable storage medium for storing program code. The program code is used for performing any implementation in the face image generation methods according to the foregoing embodiments.

An embodiment of the disclosure further provides a computer program product. The computer program product includes instructions. The instructions, when run on a computer, cause the computer to perform any implementation in the face image generation methods according to the foregoing embodiments.

A person skilled in the art may clearly understand that for convenience and conciseness of description, for specific working processes of the foregoing systems, devices and units, reference may be made to the corresponding processes in the foregoing method embodiments, and details are not described herein again.

In the example embodiments provided in the disclosure, it is to be understood that the disclosed system, apparatus, and method may be implemented in other manners. For example, the described apparatus embodiment is merely an example. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of the disclosure may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the disclosure essentially, or at least the part contributing to the related art, or all or some of the technical solutions may be implemented in a form of a software product. The software product is stored in a storage medium, and includes instructions for instructing a computer device (which may be a personal computer, a server, a network device, or the like) to perform all or some of the operations of the methods described in the embodiments of the disclosure. The foregoing storage medium includes: any medium that may store program code, such as a USB flash drive, a removable hard disk, a read-only memory (ROM), a random access memory (RAM), a magnetic disk, or an optical disc.

It is to be understood that, in the disclosure, "at least one" means one or more, and "a plurality of" means two or more. The term "and/or" describes an association between associated objects and represents that three associations may exist. For example, "A and/or B" may indicate that only A exists, only B exists, and both A and B exist, where A and B may be singular or plural. The character "/" in this specification generally indicates an "or" relationship between the associated objects. "At least one of the following items" or a similar expression means any combination of these items, including a single item or any combination of a plurality of items. For example, at least one of a, b, or c may represent a, b, c, "a and b", "a and c", "b and c", or "a, b, and c", where a, b, and c may be singular or plural.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

As can be seen from the foregoing technical solution, the example embodiments of the disclosure have the following advantages.

The example embodiments of the disclosure provide a face image generation method. According to a first face image in a first reference element, a 3DMM corresponding to the first face image is determined as a first model. According to a second reference element used for representing a posture and/or an expression of a target face image, a 3DMM corresponding to the second reference element is determined as a second model. An initial optical flow map corresponding to the first face image is then determined according to the first model and the second model. As may be known, the method determines the initial optical flow map through 3DMMs. The method, on one hand, may retain a contour of the face image in the first reference element and at least one of the posture and the expression of the target face image identified by the second reference element, and on the other hand, may achieve parameterized control through the 3DMMs, thereby facilitating a user to achieve personalized image synthesis according to an actual demand. Next, a corresponding initial deformation map is obtained by deforming the first face image according to the initial optical flow map, and an optical flow increment map and a visibility probability map that correspond to the first face image are obtained through a convolutional neural network, and then the target face image is generated according to the first face image and the initial optical flow map, the optical flow increment map, and the visibility probability map that correspond to the first face image, so that the method retains more details of an original image in the generated target face image, thereby the target face image being more realistic and natural. In addition, the method does not rely on a single network, but implements the corresponding functions through different small networks, thereby greatly reducing a parameter space, reducing model complexity, and improving generalization performance. In a practical application, the method may generate a natural and realistic face image.

The foregoing embodiments are merely intended for describing the technical solutions of the disclosure, but not for limiting the disclosure. Although the disclosure is described in detail with reference to the foregoing embodiments, a person of ordinary skill in the art is to understand that they may still make modifications to the technical solutions described in the foregoing embodiments or make equivalent replacements to some technical features thereof, without departing from the spirit and scope of the technical solutions of the embodiments of the disclosure.

What is claimed is:

1. A face image generation method, performed by at least one processor of a processing device, the method comprising:
   determining, according to a first face image, a three dimensional (3D) morphable model (3DMM) corresponding to the first face image as a first model;
   determining, according to a reference element, a 3DMM corresponding to the reference element as a second model, the reference element representing a posture and/or an expression of a target face image;
   determining, according to the first model and the second model, an initial optical flow map corresponding to the first face image, and deforming the first face image according to the initial optical flow map to obtain an initial deformation map corresponding to the first face image;
   obtaining, through a convolutional neural network according to the first face image, the initial optical flow map, and the initial deformation map, an optical flow increment map and a visibility probability map that correspond to the first face image; and
   generating the target face image according to the first face image, the initial optical flow map, the optical flow increment map, and the visibility probability map.

2. The face image generation method according to claim 1, further comprising:
   optimizing the target face image through a generative adversarial network model, to obtain the optimized target face image outputted by the generative adversarial network model.

3. The face image generation method according to claim 1, wherein the determining the 3DMM corresponding to the reference element comprises:
   based on the reference element comprising a target model parameter, determining, according to the target model parameter, a 3DMM corresponding to the target model parameter as the second model.

4. The face image generation method according to claim 1, wherein the determining the 3DMM corresponding to the reference element comprises:
   based on the reference element comprising a second face image, determining, according to the second face image, a 3DMM corresponding to the second face image as the second model, and
   wherein the second face image is different from the first face image.

5. The face image generation method according to claim 1, wherein the determining the 3DMM corresponding to the first face image comprises:
   detecting face key point coordinates in the first face image;
   determining an initial 3DMM according to an average face image, and projecting 3D coordinates of the initial 3DMM to a two dimensional (2D) image to obtain projection coordinates, the average face image being a synthetic face image obtained by extracting features from a number of face images; and
   determining a first model parameter that minimizes a distance between the face key point coordinates and the projection coordinates, and determining, according to the first model parameter, a 3DMM corresponding to the first face image.

6. The face image generation method according to claim 1, wherein the determining the 3DMM corresponding to the first face image comprises:
   detecting face key point coordinates in the first face image;
   obtaining, according to the face key point coordinates and the first face image, a second model parameter through a neural network model; and
   determining, according to the second model parameter, the 3DMM corresponding to the first face image.

7. The face image generation method according to claim 1, wherein the generating the target face image comprises:
   performing, according to the optical flow increment map corresponding to the first face image, optical flow completion on the initial optical flow map corresponding to the first face image, to obtain a target optical flow map corresponding to the first face image;
   deforming, according to the target optical flow map corresponding to the first face image, the first face image to obtain a target deformation map corresponding to the first face image; and
   generating the target face image according to the target deformation map and the visibility probability map that correspond to the first face image.

8. The face image generation method according to claim 1, wherein the reference element comprises a plurality of sets of ordered target model parameters and/or a plurality of ordered second face images; and the determining the 3DMM corresponding to the reference element comprises:
  based on the reference element comprising the plurality of sets of ordered target model parameters, sequentially determining, for each set of target model parameters, a 3DMM corresponding to the target model parameters as a second model corresponding to the target model parameters; and
  based on the reference element comprising the plurality of ordered second face images, sequentially determining, for each second face image, a 3DMM corresponding to the second face image as a second model corresponding to the second face image.

9. The face image generation method according to claim 8, further comprising:
  generating an ordered image set according to a sequence of each of second models and a target face image generated based on each of the second models.

10. The face image generation method according to claim 9, further comprising:
  receiving a share instruction for the ordered image set; and
  sharing the ordered image set according to the share instruction.

11. The face image generation method according to claim 1, further comprising:
  transmitting the target face image to a terminal, and instructing the terminal to display the target face image in an application running on the terminal.

12. The face image generation method according to claim 1, wherein the first face image comprises a plurality of first face images belonging to a same person; and
  the determining the 3DMM corresponding to the first face image comprises:
  determining, for each of the plurality of first face images, the 3DMM corresponding to the first face image as the first model.

13. The face image generation method according to claim 1, wherein the convolutional neural network adopts an encoder-decoder network structure; and
  the method further comprises:
  determining a first training sample set, each training sample in the first training sample set comprising at least one set of image data and label data corresponding to the image data, the image data comprising a first sample face image, and an initial optical flow map and an initial deformation map that correspond to the first sample face image, wherein the initial deformation map corresponding to the first sample face image is obtained by deforming the first sample face image according to the initial optical flow map corresponding to the first sample face image, and the label data comprises an optical flow increment map and a visibility probability map that are calibrated; and
  performing network training through training samples in the first training sample set, to obtain the convolutional neural network.

14. The face image generation method according to claim 2, further comprising:
  determining a second training sample set, each training sample in the second training sample set comprising a second sample face image and a calibrated face image corresponding to the second sample face image; and
  training a generative adversarial network through training samples in the second training sample set, to obtain the generative adversarial network model.

15. A face image generation apparatus, comprising:
  at least one memory configured to store program code; and
  at least one processor configured to read the program code and operate as instructed by the program code, the program code comprising:
  first model generation code configured to cause at least one of the at least one processor to determine, according to a first face image in a first reference element, a three dimensional (3D) morphable model (3DMM) corresponding to the first face image as a first model;
  second model generation code configured to cause at least one of the at least one processor to determine, according to a reference element, a 3DMM corresponding to the reference element as a second model; the reference element representing a posture and/or an expression of a target face image;
  determination code configured to cause at least one of the at least one processor to determine, according to the first model and the second model, an initial optical flow map corresponding to the first face image, and deform the first face image according to the initial optical flow map to obtain an initial deformation map corresponding to the first face image;
  acquisition code configured to cause at least one of the at least one processor to obtain, through a convolutional neural network according to the first face image, the initial optical flow map, and the initial deformation map, an optical flow increment map and a visibility probability map that correspond to the first face image; and
  target face image generation configured to cause at least one of the at least one processor to generate the target face image according to the first face image and the initial optical flow map, the optical flow increment map, and the visibility probability map.

16. The apparatus according to claim 15, wherein the program code further comprises:
  optimization code configured to cause at least one of the at least one processor to optimize the target face image through a generative adversarial network model, to obtain the optimized target face image outputted by the generative adversarial network model.

17. The apparatus according to claim 15, wherein the second model generation code is further configured to cause at least one of the at least one processor to:
  based on the reference element comprising a target model parameter, determine, according to the target model parameter, a 3DMM corresponding to the target model parameter as the second model.

18. The apparatus according to claim 15, wherein the second model generation code is further configured to cause at least one of the at least one processor to:
  based on the reference element comprising a second face image, determine, according to the second face image, a 3DMM corresponding to the second face image as the second model, and
  wherein the second face image is different from the first face image.

19. The apparatus according to claim 15, wherein the first model generation code is further configured to cause at least one of the at least one processor to:
  detect face key point coordinates in the first face image;
  determine an initial 3DMM according to an average face image, and project 3D coordinates of the initial 3DMM to a 2D image to obtain projection coordinates, the average face image being a synthetic face image obtained by extracting features from a number of face images; and determine a first model parameter that minimizes a distance between the face key point coordinates and the projection coordinates, and determine, according to the first model parameter, a 3DMM corresponding to the first face image as the first model.

20. A non-transitory computer-readable storage medium storing instructions, the instructions being executable by at least one processor to cause at least one of the at least one processor to perform:

determining, according to a first face image, a three dimensional (3D) morphable model (3DMM) corresponding to the first face image as a first model;

determining, according to a reference element, a 3DMM corresponding to the reference element as a second model, the reference element representing a posture and/or an expression of a target face image;

determining, according to the first model and the second model, an initial optical flow map corresponding to the first face image, and deforming the first face image according to the initial optical flow map to obtain an initial deformation map corresponding to the first face image;

obtaining, through a convolutional neural network according to the first face image, the initial optical flow map, and the initial deformation map, an optical flow increment map and a visibility probability map that correspond to the first face image; and generating the target face image according to the first face image, the initial optical flow map, the optical flow increment map, and the visibility probability map.

* * * * *